(12) United States Patent
Sanghi et al.

(10) Patent No.: US 11,381,514 B2
(45) Date of Patent: Jul. 5, 2022

(54) METHODS AND APPARATUS FOR EARLY DELIVERY OF DATA LINK LAYER PACKETS

(71) Applicant: Apple Inc., Cupertino, CA (US)

(72) Inventors: Karan Sanghi, San Jose, CA (US);
Saurabh Garg, San Jose, CA (US);
Cahya Adiansyah Masputra, San Jose, CA (US)

(73) Assignee: Apple Inc., Cupertino, CA (US)

(*) Notice: Subject to any disclaimer, the term of this patent is extended or adjusted under 35 U.S.C. 154(b) by 188 days.

(21) Appl. No.: 15/973,153

(22) Filed: May 7, 2018

(65) Prior Publication Data

US 2019/0342225 A1 Nov. 7, 2019

(51) Int. Cl.
*H04L 47/62* (2022.01)
*H04L 45/30* (2022.01)

(52) U.S. Cl.
CPC ............ *H04L 47/624* (2013.01); *H04L 45/30* (2013.01); *H04L 47/6205* (2013.01)

(58) Field of Classification Search
CPC .... H04L 47/6205; H04L 47/624; H04L 45/30
See application file for complete search history.

(56) References Cited

U.S. PATENT DOCUMENTS

| | | | |
|---|---|---|---|
| 4,949,299 A | 8/1990 | Pickett | |
| 4,987,529 A | 1/1991 | Craft et al. | |
| 5,367,688 A | 11/1994 | Croll | |
| 5,485,578 A | 1/1996 | Sweazey | |
| 5,659,542 A | 8/1997 | Bell et al. | |
| 5,850,395 A | 12/1998 | Hauser et al. | |
| 5,943,507 A | 8/1999 | Cornish et al. | |
| 6,216,178 B1 | 4/2001 | Stracovsky et al. | |
| 6,233,702 B1 | 5/2001 | Horst et al. | |
| 6,260,152 B1 | 7/2001 | Cole et al. | |

(Continued)

FOREIGN PATENT DOCUMENTS

| | | |
|---|---|---|
| EP | 3013008 A1 | 4/2016 |
| JP | 2004086792 A | 3/2004 |

(Continued)

OTHER PUBLICATIONS

ECN L1 PM Substates with CLKREQ approved Aug. 23, 2012.

(Continued)

*Primary Examiner* — Mandish K Randhawa
(74) *Attorney, Agent, or Firm* — Sterne, Kessler, Goldstein & Fox P.L.L.C.

(57) ABSTRACT

Methods and apparatus for non-sequential packet transfer. Prior art multi-processor devices implement a complete network communications stack at each processor. The disclosed embodiments provide techniques for delivering network layer (L3) and/or transport layer (L4) data payloads in the order of receipt, rather than according to the data link layer (L2) order. The described techniques enable e.g., earlier packet delivery. Such design topologies can operate within a substantially smaller memory footprint compared to prior art solutions. As a related benefit, applications that are unaffected by data link layer corruptions can receive data immediately (rather than waiting for the re-transmission of an unrelated L4 data flow) and thus the overall network latency can be greatly reduced and user experience can be improved.

14 Claims, 16 Drawing Sheets

(56) References Cited

U.S. PATENT DOCUMENTS

| | | |
|---|---|---|
| 6,359,863 B1 | 3/2002 | Varma et al. |
| 6,411,997 B1 | 6/2002 | Dawes et al. |
| 6,434,633 B1 | 8/2002 | Braun et al. |
| 6,553,446 B1 | 4/2003 | Miller |
| 6,693,895 B1 | 2/2004 | Crummey et al. |
| 6,735,642 B2 | 5/2004 | Kagan et al. |
| 6,947,442 B1 | 9/2005 | Sato et al. |
| 6,948,094 B2 | 9/2005 | Schultz et al. |
| 7,100,020 B1 | 8/2006 | Brightman et al. |
| 7,191,240 B1 | 3/2007 | Johnson |
| 7,281,172 B2 | 10/2007 | Chujo |
| 7,397,774 B1 | 7/2008 | Holland et al. |
| 7,398,382 B2 | 7/2008 | Rothman et al. |
| 7,506,084 B2 | 3/2009 | Moerti et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,853,731 B1 | 12/2010 | Zeng |
| 7,899,941 B2 | 3/2011 | Hendry et al. |
| 7,908,335 B1 | 3/2011 | Citterelle et al. |
| 7,941,682 B2 | 5/2011 | Adams |
| 8,230,248 B2 | 7/2012 | Dance et al. |
| 8,255,725 B2 | 8/2012 | Shimazaki et al. |
| 8,310,965 B1 | 11/2012 | Zhang et al. |
| 8,352,624 B2 | 1/2013 | Zimmerman et al. |
| 8,422,404 B2 | 4/2013 | Taki |
| 8,468,285 B2 | 6/2013 | Kobayashi |
| 8,555,099 B2 | 10/2013 | Marinkovic et al. |
| 8,656,228 B2 | 2/2014 | Check et al. |
| 8,769,168 B2 | 7/2014 | Moertl et al. |
| 8,788,822 B1 | 7/2014 | Riddle |
| 8,799,537 B1 | 8/2014 | Zhu et al. |
| 8,808,091 B2 | 8/2014 | Shaw et al. |
| 8,832,331 B2 | 9/2014 | Co |
| 8,848,809 B2 | 9/2014 | Whitby-Strevens |
| 8,914,649 B2 | 12/2014 | So et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,544,069 B2 | 1/2017 | Whitby-Strevens et al. |
| 9,568,970 B1 | 2/2017 | Kaushal et al. |
| 9,582,448 B2 | 2/2017 | Saitou |
| 9,628,211 B1 | 4/2017 | Stoler et al. |
| 9,762,482 B2 | 9/2017 | Sukumar et al. |
| 9,769,756 B1 | 9/2017 | Cui et al. |
| 9,910,475 B2 | 3/2018 | Kurts et al. |
| 9,913,305 B2 | 3/2018 | Pinheiro et al. |
| 9,959,124 B1 | 5/2018 | Herbeck et al. |
| 2002/0044553 A1 | 4/2002 | Chakravorty |
| 2002/0169938 A1 | 11/2002 | Scott et al. |
| 2003/0086122 A1 | 5/2003 | Parry |
| 2003/0112758 A1 | 6/2003 | Pang et al. |
| 2004/0044929 A1 | 3/2004 | Chujo |
| 2004/0064589 A1 | 4/2004 | Boucher et al. |
| 2004/0179546 A1 | 9/2004 | Mcdaniel et al. |
| 2004/0201749 A1 | 10/2004 | Malloy |
| 2004/0221056 A1 | 11/2004 | Kobayashi |
| 2004/0228365 A1 | 11/2004 | Kobayashi |
| 2004/0268172 A1 | 12/2004 | Kates et al. |
| 2005/0033947 A1 | 2/2005 | Morris et al. |
| 2005/0108385 A1 | 5/2005 | Wechter et al. |
| 2005/0117601 A1 | 6/2005 | Anderson et al. |
| 2005/0157781 A1 | 7/2005 | Ho et al. |
| 2005/0285862 A1 | 12/2005 | Noda et al. |
| 2006/0039285 A1 | 2/2006 | Chapman et al. |
| 2006/0218301 A1 | 9/2006 | O'Toole et al. |
| 2007/0070997 A1 | 3/2007 | Weitz et al. |
| 2007/0201492 A1 | 8/2007 | Kobayashi |
| 2007/0286246 A1 | 12/2007 | Kobayashi |
| 2008/0010563 A1 | 1/2008 | Nishimura |
| 2008/0077816 A1 | 3/2008 | Ravichandran |
| 2008/0231711 A1 | 9/2008 | Glen et al. |
| 2008/0235355 A1 | 9/2008 | Spanier et al. |
| 2008/0301148 A1 | 12/2008 | Lee et al. |
| 2009/0024924 A1 | 1/2009 | Kim |
| 2009/0189442 A1 | 7/2009 | Chi |
| 2009/0282050 A1 | 11/2009 | Thomas et al. |
| 2009/0282088 A1 | 11/2009 | Thomas et al. |
| 2010/0017655 A1 | 1/2010 | Gooding et al. |
| 2010/0027729 A1 | 2/2010 | Murphy et al. |
| 2010/0030932 A1 | 2/2010 | Ergas et al. |
| 2010/0082859 A1 | 4/2010 | Hendry et al. |
| 2010/0097931 A1* | 4/2010 | Mustafa ............... H04L 43/026 370/235 |
| 2010/0098419 A1 | 4/2010 | Levy et al. |
| 2010/0329319 A1 | 12/2010 | Dai et al. |
| 2011/0022859 A1 | 1/2011 | More et al. |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0084483 A1 | 4/2012 | Sanjive |
| 2012/0084484 A1 | 4/2012 | Post et al. |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0124895 A1 | 5/2013 | Saha et al. |
| 2013/0162911 A1 | 6/2013 | Glen |
| 2014/0033220 A1 | 1/2014 | Campbell et al. |
| 2014/0189057 A1 | 7/2014 | Sankoda et al. |
| 2014/0215236 A1 | 7/2014 | Heinrich et al. |
| 2014/0244866 A1 | 8/2014 | Manula et al. |
| 2014/0247983 A1 | 9/2014 | Macinnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0293873 A1 | 10/2015 | Shao et al. |
| 2015/0309650 A1 | 10/2015 | Ahmed et al. |
| 2015/0378737 A1 | 12/2015 | Debbage et al. |
| 2016/0041852 A1 | 2/2016 | Suarez et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0179157 A1 | 6/2016 | Ardanaz et al. |
| 2016/0191400 A1* | 6/2016 | Sreeramoju ........... H04L 69/166 370/474 |
| 2016/0224442 A1 | 8/2016 | Sanghi et al. |
| 2016/0269991 A1 | 9/2016 | Van et al. |
| 2016/0299860 A1 | 10/2016 | Harriman |
| 2016/0364350 A1 | 12/2016 | Sanghi et al. |
| 2017/0108912 A1 | 4/2017 | Li et al. |
| 2017/0177222 A1 | 6/2017 | Singh et al. |
| 2017/0222943 A1* | 8/2017 | Yao .................... H04L 47/624 |
| 2017/0228481 A1 | 8/2017 | Pusuluri et al. |
| 2017/0269675 A1 | 9/2017 | Klacar et al. |
| 2017/0325124 A1* | 11/2017 | Mitra .................... H04W 28/06 |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | 2012108677 A | 6/2012 |
| JP | 2013246642 A | 12/2013 |

(56) References Cited

FOREIGN PATENT DOCUMENTS

| | | |
|---|---|---|
| KR | 1020150041072 | 4/2015 |
| KR | 1020150079788 | 7/2015 |
| WO | WO-2008070138 A2 | 6/2008 |

OTHER PUBLICATIONS

Jackson, Budruk: "PCI Express Technology", Sep. 2012 (Sep. 2012), MindShare Press, XP002777351, pp. 49,86,87,712-723.
PCI Express base Specification Revision 3.0, published Nov. 10, 2010.
PCI Express Base Specification Revision 3.1, published Oct. 8, 2014.
PCI Express Base Specification Revision 4.0, Oct. 5, 2017.
Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

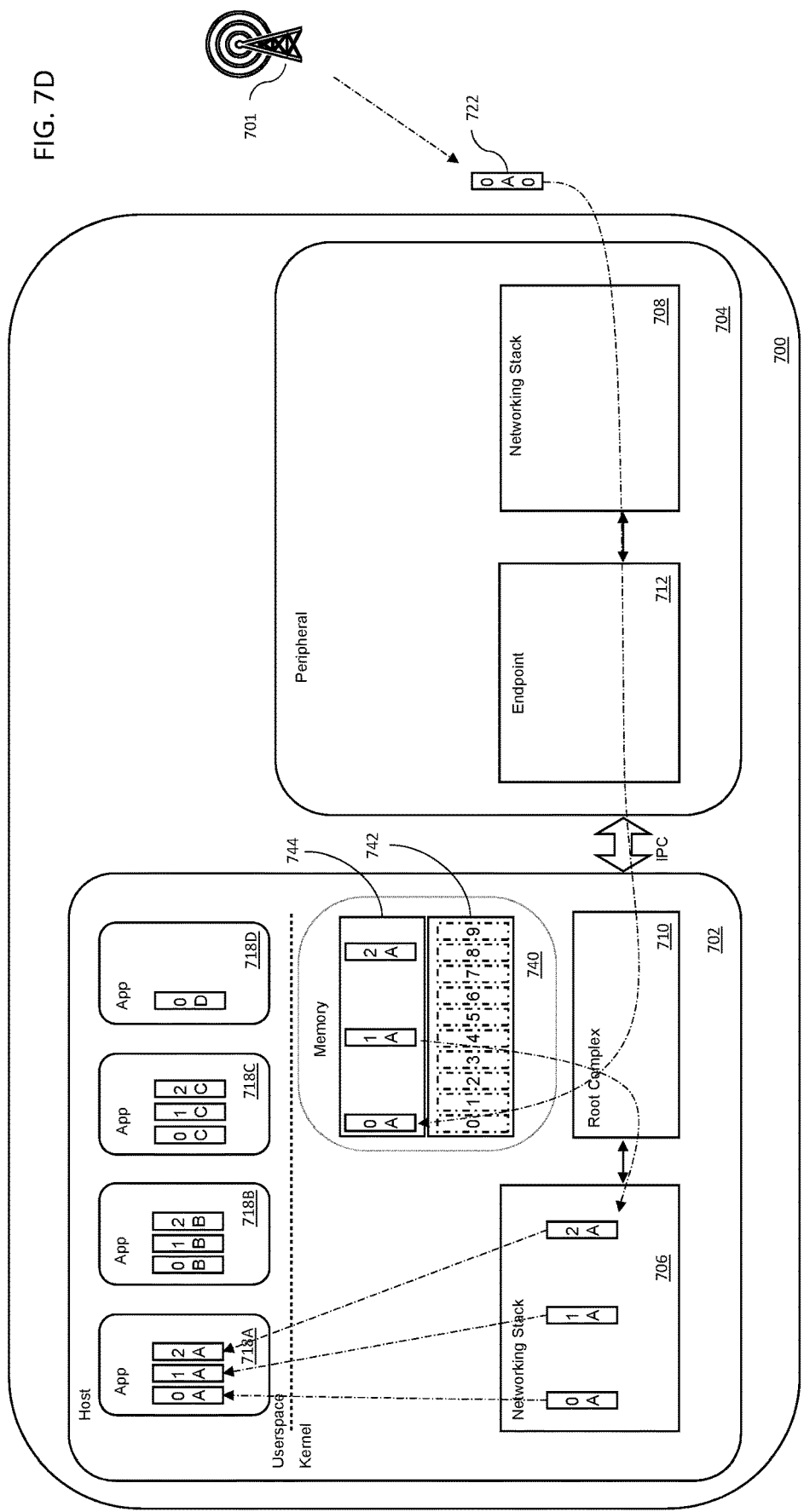

METHODS AND APPARATUS FOR EARLY DELIVERY OF DATA LINK LAYER PACKETS

RELATED APPLICATIONS

This application is related to commonly owned U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS" and filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS" and filed Oct. 8, 2015; Ser. No. 14/856,283 entitled "METHODS AND APPARATUS FOR AGGREGATING PACKET TRANSFER OVER A VIRTUAL BUS INTERFACE" and filed Sep. 16, 2015; each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronics devices, as well as networks thereof. More particularly, and in one exemplary aspect, the disclosure is directed to methods and apparatus for non-sequential packet delivery. Various aspects of the present disclosure are directed to, in one exemplary aspect, early delivery of data link layer packets.

2. Description of Related Technology

Traditionally, data networks are classified as "packet-switched" or "circuit-switched." In circuit-switched networks, a "circuit" connection is dedicated between endpoints for a fixed time, and data is typically transmitted as a continuous data stream. In contrast, packet-switched networks segment data into "packets" for transfer over shared network links between endpoints. Packet based data transfer techniques enable e.g., error correction, flexible allocation of network resources, and simplified network management in comparison to e.g., circuit switched data transfer techniques.

Existing networking technologies were designed for, and assume, sequential packet delivery. Consider a consumer device (such as the iPhone® manufactured by the Assignee hereof) that includes a cellular or Wi-Fi modem that receives data packets via a wireless interface and provides the data packets to an application processor (AP) for subsequent processing. In some situations, packet routing can be problematic. For example, packets that are missing or otherwise corrupted over-the-air cannot be transferred to the AP until they are received correctly. Additionally, these packet "holes" can delay delivery of packets that are later received. More directly, data packets that have been received correctly may be held in-queue behind the errored packets until the entire packet sequence can be delivered in sequence. In other words, the sequential delivery requirement for packets results in a "head-of-line" blocking for every packet behind the missing packet (the packet "hole"). As used herein, the term "head-of-line" refers to a performance-limiting phenomenon that occurs when a line of packets is held up by a first packet.

Furthermore, not all packets are of the same priority. In some cases, high priority packet data can be stuck behind low priority data. This can result in significant delays or performance degradation for software executing on an application processor. Additionally, certain types of operations may be improved with out-of-sequence processing. For example, DNS reply packets and/or TCP SYN/SYN_ACK packets are kernel space operations that are not associated with any particular user application but faster response rates can improve overall network operation.

To these ends, improved methods and apparatus for packet routing are needed. More directly, solutions are needed that enable delivery of correctly received packets, even where other data packets have been corrupted, dropped or are otherwise undeliverable.

SUMMARY

The present disclosure satisfies the foregoing needs by providing, inter alia, methods and apparatus for non-sequential packet delivery.

In one aspect, a processor apparatus is disclosed. In one embodiment, the processor apparatus is configured to support non-sequential delivery of data packets. The processor apparatus may include: a first interface configured to receive a plurality of data packets; a second interface configured to interface to another processor apparatus; a processor; and a non-transitory computer-readable medium that includes one or more computer-executable instructions. The one or more instructions when executed by the processor, causes the processor apparatus to: determine whether the another processor apparatus supports non-sequential delivery of data packets; when the another processor apparatus supports the non-sequential delivery of data packets: provide the data packets to the another processor apparatus in a non-sequential order determined based on a network address and/or network port and an endpoint-to-endpoint transport order associated with an application.

In one variant, the first interface includes a wireless network interface.

In another variant, the one or more instructions when executed by the processor, further causes the processor apparatus to: provide a second set of data packets to the another processor apparatus in a second non-sequential order determined based on a second network address and/or network port and a second endpoint-to-endpoint transport order associated with a second application.

In yet another variant, the second interface includes a shared memory interface with the another processor apparatus. In one exemplary variant, the shared memory interface includes one or more transfer descriptor rings (TDR).

In yet another variant, the non-sequential order is further based on a power consumption of either the processor apparatus or the another processor apparatus.

In yet another variant, the non-sequential order is further based on one or more priorities of an application of the another processor apparatus.

In another embodiment, the processor apparatus is configured to receive non-sequential delivery of data packets. The processor apparatus includes: a first interface configured to receive a plurality of data packets; a processor; and a non-transitory computer-readable medium. The one or more instructions which when executed by the processor, causes the processor apparatus to: execute a plurality of applications; identify a plurality of data flows corresponding to the plurality of applications, where each data flow of the plurality of data flows includes a subset of the plurality of data packets; and for the each data flow of the plurality of data flows: when the subset of the plurality of data packets are successfully received, determine a data packet order for the subset of the plurality of data packets; re-order the subset of the plurality of data packets according to the data packet order; and provide the each data flow to the corresponding application in accordance with the re-ordered subset of the plurality of data packets.

In one variant, the first interface includes a shared memory interface with another processor apparatus. In one such variant, the shared memory interface includes one or more transfer descriptor rings (TDR). In another such variant, the shared memory interface includes a memory configured to store networking metadata.

In another variant, the one or more instructions further includes instructions that when executed by the processor, causes the processor apparatus to identify one or more missing intervening data packets associated with a data flow; and store the data packets until the identified one or more missing intervening data packets are successfully received.

In yet another variant, the one or more instructions further includes instructions that when executed by the processor, causes the processor apparatus to identify one or more missing intervening data packets associated with a data flow; and request re-delivery of the one or more missing intervening data packets.

In yet another variant, the non-transitory computer-readable medium includes one or more instructions that when executed by the processor, causes the processor apparatus to notify another processor apparatus of one or more prioritized packet types.

In yet another variant, the one or more prioritized packet types are based on an application.

In another aspect, a method for non-sequential delivery of packets is disclosed. In one embodiment, the method includes: executing a plurality of applications; identifying a plurality of data flows corresponding to the executed plurality of applications; receiving one or more data packets corresponding to various ones of the plurality of data flows; waiting to retrieve the data packets associated with a data flow when there is at least one missing intervening data packets associated with the data flow; and retrieving and routing the data packets associated with the data flow when the at least one missing intervening data packets is successfully received.

In one variant, the identification of the data flows is based on a network address and/or network port and an endpoint-to-endpoint transport order associated with an application.

In another variant, the identifying the at least one missing intervening data packets is based on the endpoint-to-endpoint transport order.

In yet another variant, the method further includes requesting the re-transmission of the at least one missing intervening data packets based on a flush event. In one such case, the flush event is based on a failure in a data link order associated with an adjacent network node.

In one aspect, a non-transitory computer readable medium is disclosed. In one embodiment, the non-transitory computer readable medium includes instructions which when executed by a processor are configured to non-sequentially deliver data packets. In one embodiment, the non-transitory computer readable medium includes instructions which when executed by a processor are configured to receive data packets non-sequentially.

In one aspect, a method for receiving data packets non-sequentially is disclosed.

In one aspect, a system for configured to support non-sequential delivery of data packets between independently operable processors is disclosed.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 7A-7D are logical representations of one exemplary apparatus configured to deliver data link layer packets non-sequentially, in accordance with various aspects of the present disclosure.

Figure 1:
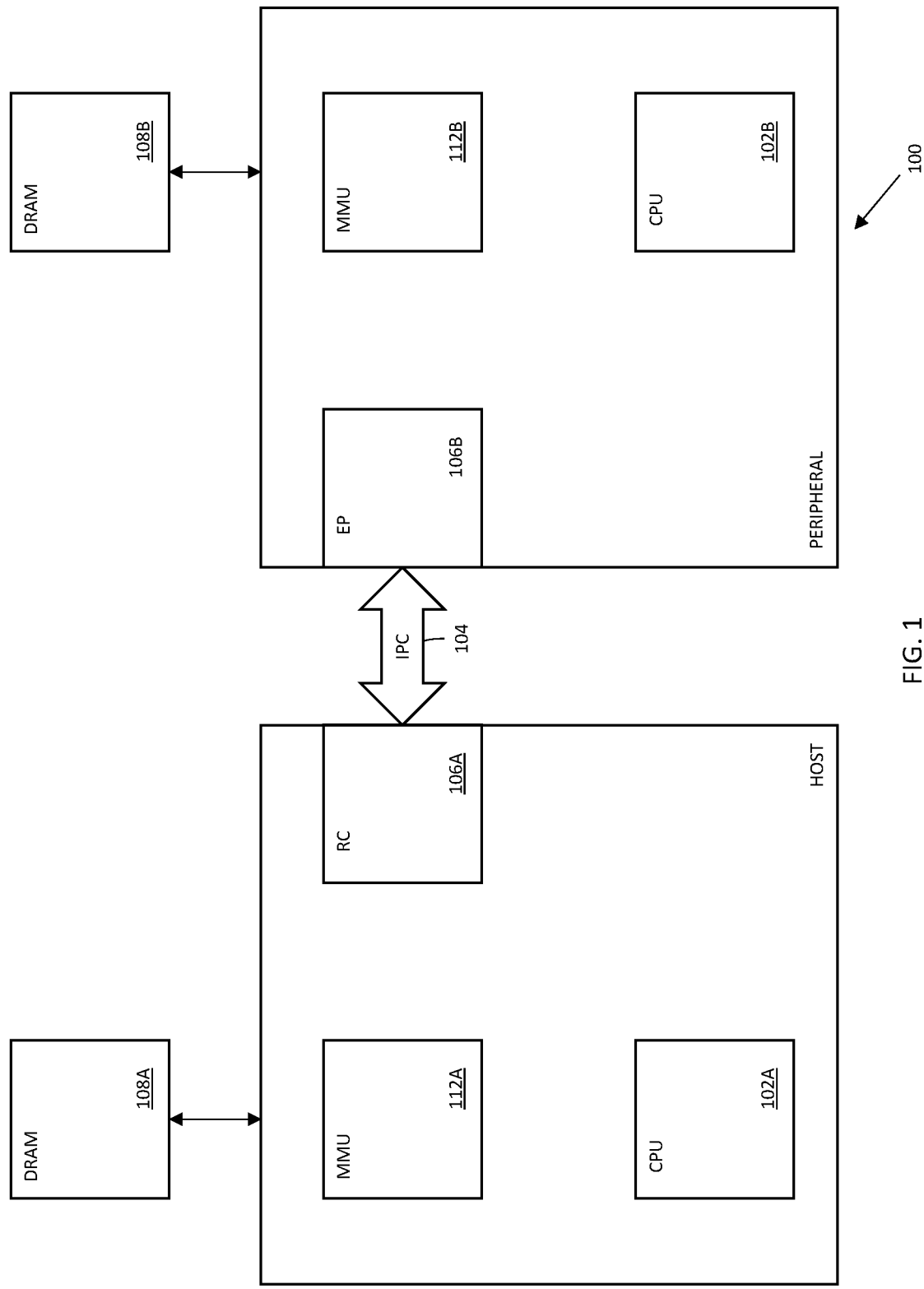
FIG. 1 illustrates an exemplary apparatus useful for explaining various principles described herein.

All figures © Copyright 2017-2018 Apple Inc. All rights reserved.

DETAILED DESCRIPTION

Reference is now made to the drawings, wherein like numerals refer to like parts throughout.
Detailed Description of Exemplary Embodiments
Exemplary Apparatus Exemplary embodiments of the present disclosure are now described in detail. While these embodiments are primarily discussed in the context of an inter-processor communication (IPC) link (for example, of the type described within commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS" and filed Oct. 8, 2015, previously incorporated herein by reference in its entirety), it will be recognized by those of ordinary skill that the present disclosure is not so limited. In fact, the various aspects of the disclosure are useful in any device or network of devices that experiences head-of-line blocking due to sequential delivery requirements for packets, as is disclosed herein.

The following discussions will be described in reference to a "root complex" (RC) (or "host") processor, and an "endpoint" (EP) (or "peripheral") processor. For reasons which will become apparent below, it is appreciated that the designation as to host or peripheral processor is used to simplify and/or clarify the following explanations, and does not imply existing host or peripheral functionality, or that such roles cannot be reversed.

As used herein, a "processor" refers generally to any logic or circuitry that responds to and processes computer-readable instructions that are stored within, for example, a non-transitory computer-readable medium, e.g., a memory.

The IPC protocol may be based on a "shared" memory interface for run-time processing (i.e., the independently operable processors each share, either virtually or physically, a common memory interface). In one such embodiment, the shared memory interface provides a multi-channel IPC link for high throughput transfers. The shared memory interface remains functional when any one of the independently operable processors is active, even when one or more of the remaining independently operable processors are asleep, powered down, powered off, etc.

As used herein, the term "independently operable processor" refers to a processing system having one or more of the processor clock domain, processor power domain, processor code base, arithmetic units, registers, and/or memory, capable of being isolated to allow the processor to operate without other processors in the processing system.

As used herein, the term "logical" or "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

As used herein, the term "in-band" refers without limitation to data transactions which are transacted within a primary logical or physical interface, and which affect the mechanisms, attributes or functionalities of the primary logical or physical interface. In contrast, the term "out-of-band" refers to data transactions which are not transacted within the primary logical or physical interface, and which affect the mechanisms, attributes or functionalities of the primary logical or physical interface.

FIG. 1 illustrates exemplary apparatus 100 useful for illustrating various principles described herein. As shown, the apparatus 100 includes a first and second independently operable processor (102A, 102B), and a physical bus interface 104 that is configured to implement an inter-processor communication (IPC) link between the two (or more) independently operable processors.

In one exemplary embodiment, the first and second processor are connected via a bus interface. As used herein, the term "bus interface" refers to any communication system that transfers data between processors and/or peripheral components. A bus interface may include, in part or whole, hardware components (wiring, optical fiber, and other transmission mediums) and/or associated software (including communication protocols and hardware drivers).

As used herein, an "inter-processor communication link" or "IPC link" refers to any communication bus between two (or more) processors, whether the processors are operating independently, not independently, or a combination thereof. An IPC link may include one or more data pipes that are configured to transfer data from one processor to another, for example, between a host side (e.g., root complex) and peripheral side (e.g., endpoint) of the link. A given data pipe of an IPC link may be configured to transfer the data in a unidirectional or bidirectional fashion.

As used herein, "unidirectional" relates to transmission or reception of data (e.g., instructions, packets, signals) in one direction such that the data is only configured to be transferred from a given computing entity (e.g., logic, circuitry, processor) to another computing entity, but not in the other direction (i.e., from the other computing entity back to the given computing entity).

On the other hand, "bidirectional" or "multidirectional" relates to transaction of data (e.g., instructions, packets, signals) in two or more directions such that the data may be configured to be transferred between a given computing entity (e.g., logic, circuitry, processor) to another computing entity (and vice versa).

In one implementation, the first processor 102A includes an application processor (AP). As shown in FIG. 1, the first processor 102A is coupled to a Root Complex (RC) 106A which functions as the host of the IPC bus. In one implementation, the second processor 102B includes a wireless modem. In other embodiments, the second processor 102B may be e.g., a media processor, or other network processing element.

Common examples of processors include without limitation, application processors (AP), baseband processors (BB), media processors, network processors (e.g., network routers, gateways, hubs, and/or other network accelerators), hardware accelerators, graphics processors, digital signal processors (DSP), field programmable gate arrays (FPGA), application specific integrated circuits (ASIC), neural networks, artificial intelligence (AI) engines, security modules, and/or any other processing logic.

As a brief aside, so-called "application processors" are processors that are configured to execute an operating system (OS) and one or more applications, firmware, and/or software. The term "operating system" refers to software that controls and manages access to hardware. An OS commonly supports processing functions such as e.g., task scheduling, application execution, input and output management, memory management, security, and peripheral access. As used herein, the term "application" refers to software that can interact with the hardware only via procedures and interfaces offered by the OS.

A so-called "baseband processor" is a processor that is configured to communicate with a wireless network. Common examples of wireless networks include, without limitation, Long Term Evolution/Advanced (LTE and LTE-A) technology, IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band networks).

As shown in FIG. 1, the second processor 102B is coupled to an Endpoint (EP) 106B which functions as the peripheral of the IPC link.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. In some cases, the first and/or second processors may have an associated non-volatile memory (e.g., a flash memory) which is configured to store computer readable instructions, and retain the stored computer readable instructions without power.

As used herein, the term "buffer" refers to a device, circuit, logic, or an area of a computing environment that is used to store data temporarily, typically stored thereon until instructions are given or received to move the stored data to another entity (e.g., processor, memory, another buffer). The term "buffer" may be interchangeable with similar terms such as "queue" or "memory" or "local memory" depending on the context. In one embodiment, a buffer may be a type of memory. Examples of types of buffers may include, circular or ring buffer, FIFO (first in, first out), LIFO (latest in, first out), round robin, shortest job first, shortest remaining time, dynamic array. Persons of ordinary skill in the relevant art will recognize various other structures and operations related to buffering and temporary data storage.

As shown, both the first and the second processors (102A, 102B) are each coupled to a non-transitory computer readable medium (e.g., dynamic random access memory (DRAM)) (108A, 108B) and a memory management unit (MMU) (110A, 110B). The non-transitory computer readable medium is configured to store computer readable instructions for execution.

Figure 2:
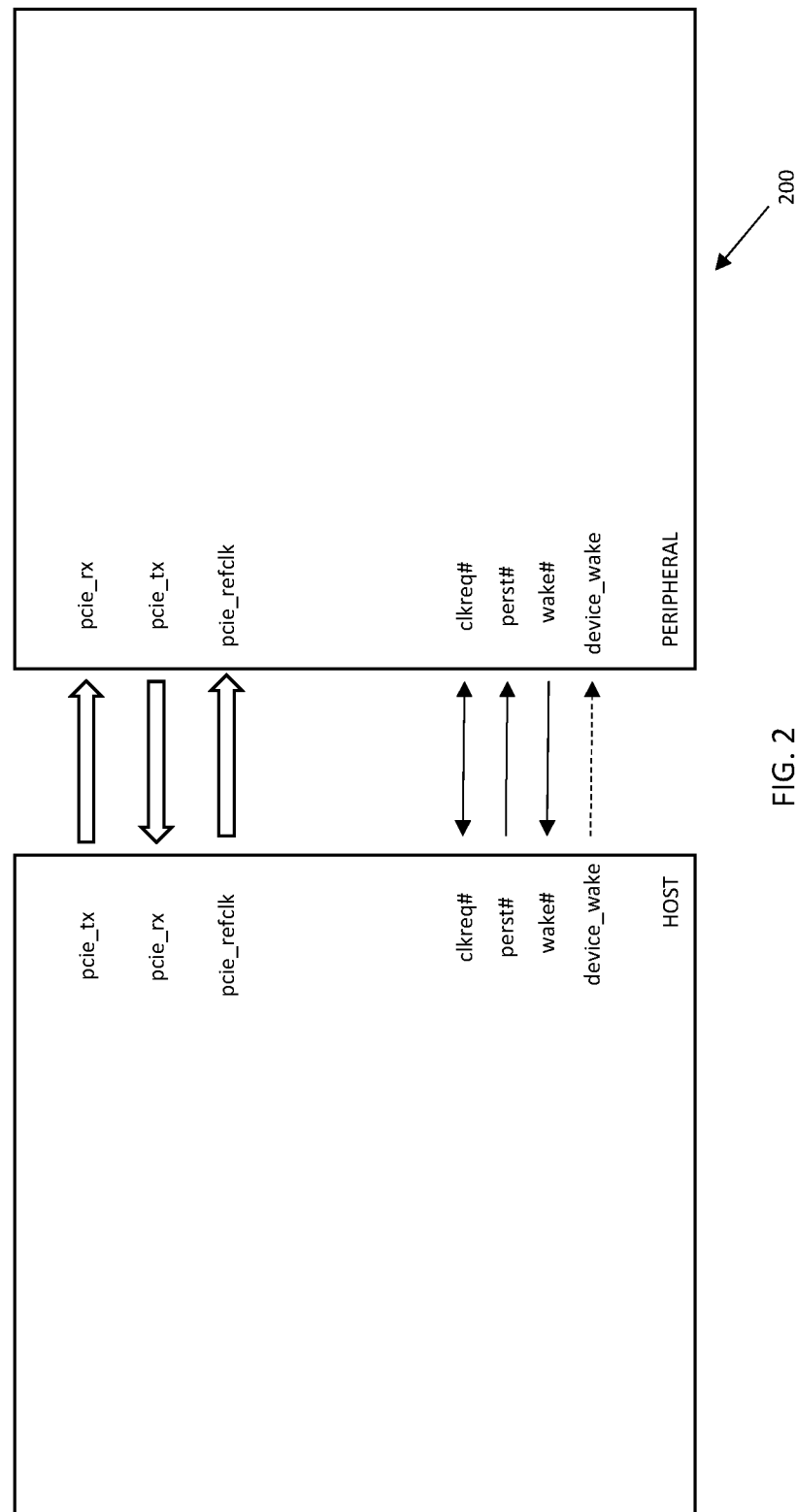
FIG. 2 illustrates an exemplary inter-processor communications link, useful for explaining various principles described herein.

As shown in FIG. 2, the physical bus interface 104 may be loosely based on the Peripheral Component Interconnect Express (PCIe) standard (e.g., the aforementioned PCI Express Base Specification Revision 4.0 dated Oct. 5, 2017, incorporated by reference in its entirety). Those of ordinary skill in the related arts, given the contents of the present disclosure, will readily appreciate that other bus interface standards may be substituted with equal success.

In the exemplary embodiment, the physical bus interface 104 may be a point-to-point communication channel between two IPC ports (the RC and EP) allowing both to send/receive access requests (configuration read/write, I/O read/write, memory read/write) and interrupts. At the physical level, a link is composed of one or more lanes (one shown in FIG. 2), each lane having receive and transmit component (e.g., pcie_rx and pci_tx). Each lane is a full-duplex byte stream, transporting data packets in eight-bit 'byte' formats, between the RC and EP of a link, in both directions simultaneously. The physical bus interface 104 may support multiple logical links (or virtual bus interfaces) representing multiple ongoing data sessions.

In one such embodiment, each virtual bus interface may further include one or more "sessions" which are a persistent and/or semi-persistent set of data transactions (e.g., datagrams) between two logical endpoints. In some embodiments, the session may include "stateful" transactions (i.e., the data transactions are based on a current state of the session), and/or "stateless" transactions (i.e., the data transactions are not based on a current state of the session).

Figure 3:
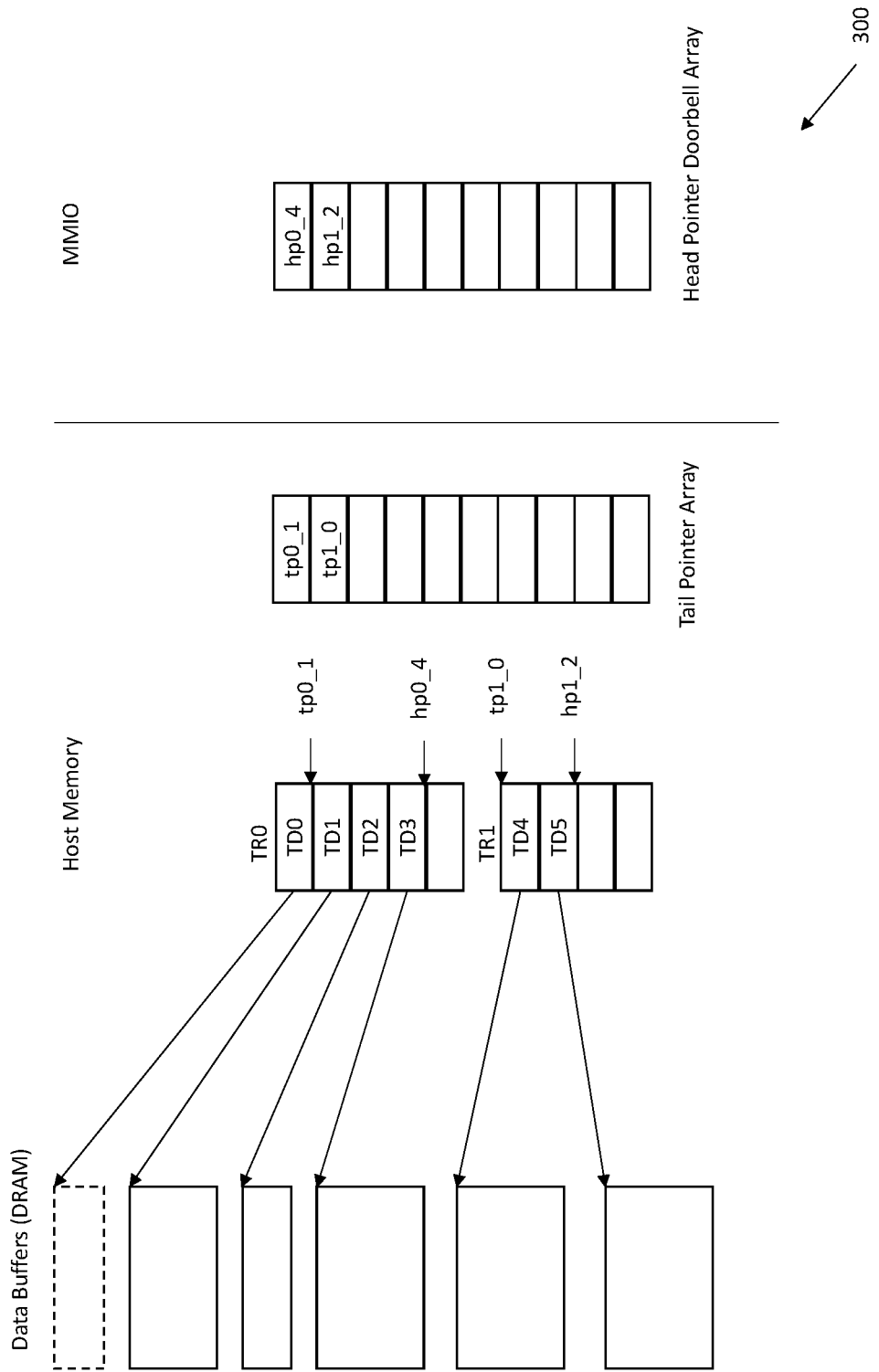
FIG. 3 illustrates exemplary data structures used during inter-processor communication (IPC) link operation.

FIG. 3 illustrates exemplary data structures 300 used during inter-processor communication (IPC) link operation.

As a brief aside, data transactions (e.g., in input/output (I/O) transactions) associated with one or more data pipes may be composed of at least one "transfer descriptor" (TD) that may be identified within a "transfer descriptor ring" (TDR) described infra. In one embodiment, a single TD may describe a physically contiguous memory buffer, accessible by the host/peripheral processor over the communication link. A TD may include various fields, such as the type of the descriptor, size of the buffer, address of the buffer, tag unique to the buffer described by the TD, remaining count indicating the number of TDs remaining in a packet transfer, a header with information at the beginning of the TD, or a footer and/or a header field containing data such as metadata or data associated with each TD.

Each "pipe" (data stream) may be associated with one "transfer descriptor ring" (TDR), also called "transfer ring" (TR). During, for example, normal bulk transaction mode operation, TDs sit inside a TDR data structure that resides in host processor memory and is accessible by the peripheral processor. Each TDR may be described by a TDR head index (also referred to as a head pointer) and/or a TDR tail index (also referred to as a tail pointer), and encompasses one or more TDs. The head pointer points to the next empty slot in the TDR, whereas the tail pointer points to the address of next TD which the peripheral will process. The head pointer is written by the host and read by the peripheral. The tail pointer is read by the host and written by the peripheral. When the head pointer is equal to the tail pointer, the TDR is empty.

The TD/TDR data structure enables independent queue processing for both the host and peripheral. For example, the peripheral can read from one area of memory described by a first TD while the other host writes to a different area of memory to prepare a different TD. Processing may be performed on a e.g., best-effort, prioritized, round robin, weighted round robin, or any number of other ordering basis. In some cases, TDs may be queued and/or flushed according to ongoing flow control and/or other bandwidth management. Various other schemes for TD processing will be readily appreciated by those of ordinary skill, given the contents of the present disclosure.

Referring back to FIG. 3, the exemplary data structures 300 include a first pipe (TDR0) in the uplink direction (from the host to the peripheral), and a second pipe (TDR1) in the downlink direction (from the peripheral to the host). As shown, the host processor has queued four (4) TDs in TDR0 for uplink transfer and informed the peripheral processor by writing the address (hp0_4) at the TDR0 head pointer offset in the HPDA (0). After the peripheral processor has successfully transmitted the data for TD0, it updates the TPA entry (0) by writing a new tail pointer address (tp0_1). When the peripheral processor updates the appropriate TPA entry, the host can free the corresponding data buffer from memory.

Similarly, as shown, the host has queued two (2) TDs in TDR1 for downlink transfer and informs the peripheral process device by writing hp1_2 at offset 1 in HPDA. Once the peripheral processor consumes these TDs, it will update TPA to inform the host.

In some implementations, the TDs may be "aggregated" into a larger scatter-gather TD to support so-called "scatter-gather" behavior for large I/O transfers (e.g., each procedure-call sequentially writes data from multiple buffers to a single data stream or reads data from a data stream to multiple buffers; the so-called "scatter/gather" refers to the process of gathering data from, or scattering data into, the given set of buffers).

Existing Data Link Layer Operation

Figure 4:
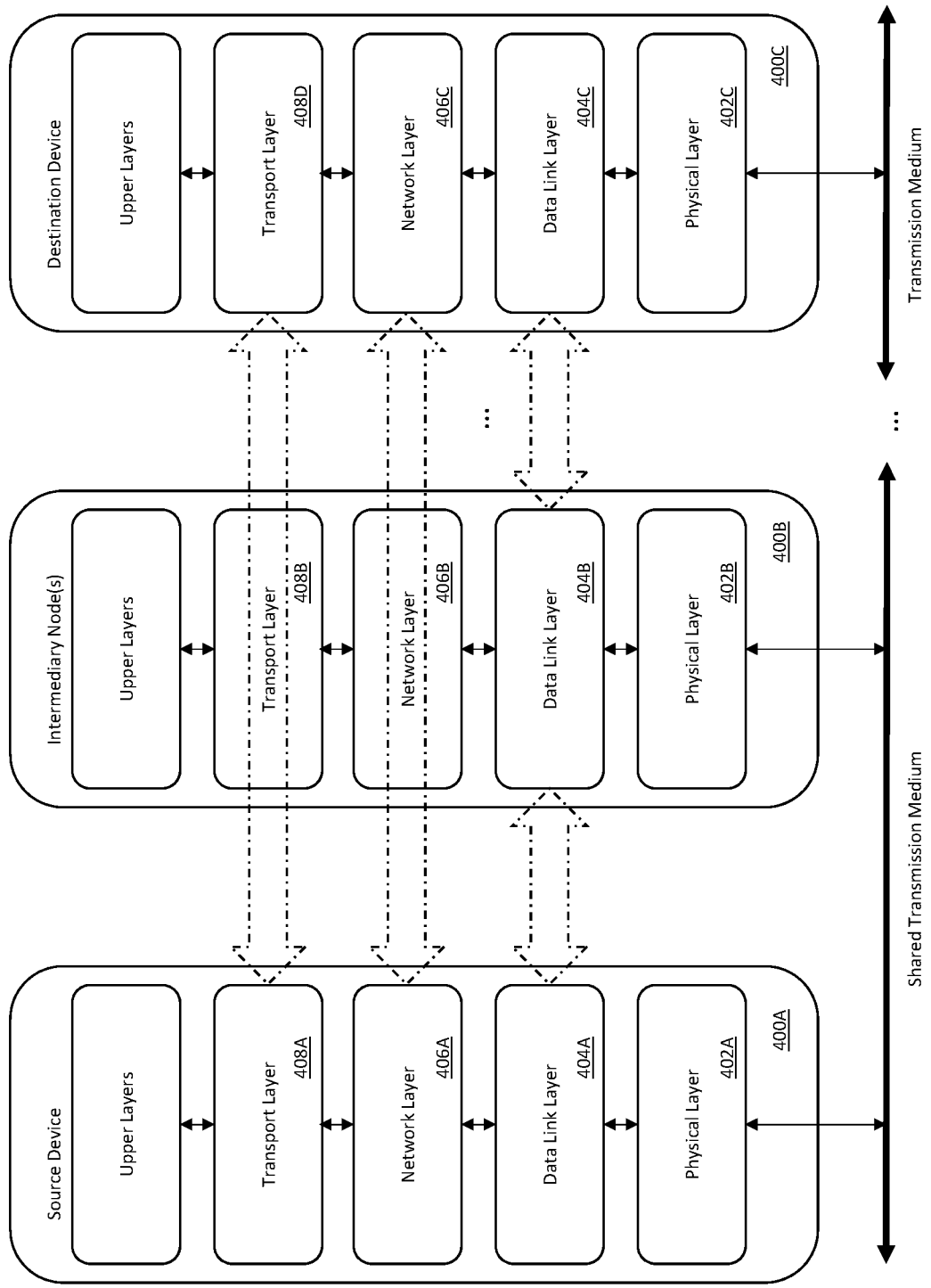
FIG. 4 is a graphical representation of the Open System Interconnection (OSI) model, useful for describing data link layer operation.

FIG. 4 is a graphical representation of the Open System Interconnection (OSI) model, useful for describing existing data link layer operation. The OSI model is commonly used within the related arts to describe the communication functions of a telecommunication or computing system in a parlance that is agnostic to the underlying internal structure and technology. The model originally defined seven (7) layers: the physical layer, data link layer, network layer, transport layer, session layer, presentation layer, and application layer. Most practical implementations use only a subset of the originally defined layers; FIG. 4 illustrates only the physical layer 402, data link layer 404, network layer 406, and transport layer 408; the upper layers are shown for reference but for conciseness and clarity are not discussed further.

Each layer of the OSI model corresponds to functions that are performed within the hardware, firmware, or software of a network device. During operation each layer serves the layer "vertically" above it, and is served by the layer "vertically" below it. For example, the data link layer may enable error-free communications across a network, and provides the link for the network layer above it, while it calls the physical layer to send and receive packets. Additionally, each layer communicates with a corresponding peer layer "horizontally" within one or more peer network device(s).

For example, as shown in FIG. 4, the data link layer 404A of a source device 400A may negotiate medium access control with a peer data link layer 404B of an intermediary node device 400B; the data link layer 404A of the source device 400A thereafter controls the physical layer 402A of the source device 400A in accordance with the negotiated access control. Similarly, the network layer 406A of the source device 400A can address network layer packets to the network layer 406C of the destination device 400C; notably, the network layer 406B of the intermediary node device 400B will receive the network layer packets from the source device 400A, and can route the network layer packet to the appropriate destination device 400C.

As used herein, a "node" is a logical termination, routing, and/or rerouting point of a communication link. A node is capable of receiving, transmitting, creating, and/or consuming data from a communications link. For example, a source node creates data for consumption at a destination node. The data may be transmitted to, and routed between intermediary nodes. Entities that only passively affect a communication link are not nodes; for example, a wire or a passive patch point (a manual switch junction) is not a node.

In slightly greater detail, the physical layer 402 is the first layer of the OSI model, which is directed to transmission technologies of a network. More directly, the physical layer 402 defines how raw bits of data are transmitted over a physical data link connecting network nodes. For example, the bit stream may be grouped into symbols and converted to a physical signal (e.g., electrical, optical) that is transmitted over a transmission medium (e.g., wires, fiber). The physical layer 402 encompasses the electrical, mechanical, and procedural interface to the transmission medium.

The data link layer 404 is the second layer of the OSI model. The data link layer 404 sits between the physical layer 402 and the network layer 406. Functionally, the data link layer 404 enables transfers of data between adjacent network nodes by formatting network layer packets of data into frames (or data link layer packets) for transmission (e.g., encapsulation of data within sequential frames), and medium access control (MAC) e.g., arbitration of control of shared transmission medium. The data link layer 404 may also include functions for flow control, acknowledgment, error notification, error detection, and/or correction of errors that occur in the physical layer 402.

For example, during data link layer 404 operation, network layer data packets are "encapsulated" within data link layer frames for transmission to an adjacent network node on a shared transmission medium. During the encapsulation process, the network layer data packet is partitioned into appropriate size "chunks" (if necessary). A frame header and trailer is added to each chunk. The frame header includes a start of frame delimiter (SFD), destination and source medium access control (MAC) address, and length (when a stop frame delimiter is not used). The frame trailer includes a frame check sequence (e.g., a 32-bit cyclic redundancy check (CRC) used to detect any in-transit corruption of data) and a stop frame delimiter (when length is not used).

The network layer 406 is the third layer of the OSI model. The network layer 406 manages network layer packet forwarding and routing via intermediate network nodes, thereby enabling transfer of network layer packets from a source to a destination address. The network layer 406 provides connection-less connectivity; in other words, each network layer packet is individually addressed and routed based on information carried in each network layer packet. The network layer functionality does not span multiple packet transfers.

For example, during network layer 406 operation, transport layer data packets are "encapsulated" within network layer packets for transmission from a source node to a destination node. The network layer encapsulation identifies a destination and source Internet Protocol (IP) address and length. The network layer encapsulation also includes a header checksum (e.g., a 16-bit cyclic redundancy check (CRC).

The transport layer 408 is the fourth layer of the OSI model. The transport layer 408 provides endpoint-to-endpoint communication guarantees, thereby enabling the endpoints to establish a persistent connection over multiple packet transfers via the underlying network(s). This can include guarantees regarding reliability, error recovery, re-transmission, flow control, and/or multiplexing. The communication guarantees may vary widely in complexity and functionality; for example, TCP provides reliable, ordered, and error-checked delivery of a stream of octets (bytes) between applications. In contrast UDP, provides a connectionless datagram service that emphasizes reduced latency over reliability.

During transport layer 408 operation, two or more endpoints establish a persistent connection between themselves (a virtual circuit). Once the connection is established, the endpoints can transfer data by encapsulating application data within transport layer packets for transmission from a source "port" to a destination "port". The application data is associated with a sequence number for ordering/re-ordering. After the persistent data transfer, the connection is closed.

As used herein, the term "packet" used herein refers generically to a basic unit of communication over a digital network. A packet may also be called a datagram, a segment, a block, a cell or a frame, depending on the protocol used for the transmission of data. However, "transport layer packets", "network layer packets", and "data link layer packets" refer to different types of packets that have specific characteristics. Explicit references to e.g., "transport layer packets", "network layer packets" and "data link layer packets" are used where the specific characteristics or aspects of the packet type are appropriate.

A "data link layer packet" or a "layer 2 (L2) packet" (also commonly referred to as a "frame") is a container for data to deliver information, called the payload, between two adjacent nodes on a shared transmission medium. Ethernet frames are one example of data link layer packets; the source and destination address of an Ethernet frame are the MAC (medium access controller) address of a network node. While a MAC address is an identification number that is unique to every Ethernet device in the entire world, generally speaking the data link layer address and/or connectivity only needs to be unique for the shared transmission medium. Similarly, Ethernet frames include a start of frame delimiter (SFD) and length or stop of frame delimiter; the data link layer sequencing information need only be unique within the shared transmission medium.

"Network layer packets" or "layer 3 (L3) packets" are a container for data with network addresses that can traverse different networks, typically via intermediary "hops" between different network nodes and/or network routers. Routers can connect small networks together for information exchange on a much larger scale using e.g., Internet Protocol (IP) network addresses for packet forwarding instead of MAC addresses. For example, a source device from a first network can transmit data to a destination device on a cellular network via e.g., a local router that delivers the data to an Internet backhaul that, in turn, routes the data to the appropriate cellular network for delivery. Unlike data link layer packets, network layer packets are not limited to adjacent nodes on a shared transmission medium; in fact, network layer packets can traverse different transmission mediums via the aforementioned routers. While both the network and data link layer uses addressing schemes, the IP and MAC addresses vary significantly in scope.

Similarly, "transport layer packets" or "layer 4 (L4) packets" are containers for sequentially ordered data that provide a continuous application data stream between endpoints of the communication network. In other words, transport layer packets virtualize a continuous circuit connection in time over the underlying network connection. While both data link layer packets and transport layer packets are sequentially ordered, data link layer packets are only sequentially ordered within the context of its adjacent connectivity. In contrast, transport layer packets are sequentially ordered within the context of the endpoints (which may span multiple different networks). For example, while the start of frame delimiter/length and a TCP frame sequence number both convey sequence, they vary significantly in scope.

Artisans of ordinary skill in the related arts will recognize that prior art implementations of the OSI model require that each layer is an "abstraction layer" i.e., each layer "hides" or isolates its functions and operation from the other layers. In the computing arts, "abstraction layers" are used to facilitate interoperability and platform independence. For example, while a network layer 406 may rely on error correction mechanisms provided by the data link layer 404, the network layer 406 is unaware of, and cannot control, how such error correction is performed. Abstraction layers enable peer layers of peer devices to communicate using common protocols with one another; each peer layer separately relies on their underlying layers to manage the lower layer functionality (that vary based on technology and implementation).

While abstraction enables different devices and networks to interoperate with one another via different network conditions and capabilities, it also inherently hides each node's operational considerations (environment, capability, functionality, etc.) from its peer nodes. Historically, each network node was a distinct device. However, modern devices use multiple independently operable processors, each of which operates as a separate network node; thus, a consumer electronics device may have multiple distinct network nodes. Unfortunately, as demonstrated hereinafter, a single device with multiple network nodes can be "bottlenecked" by only one of its networks.

FIGS. 5A-5D are logical representations of an exemplary prior art apparatus, useful for explaining prior art packet delivery. Such schemes are commonly employed within e.g., cellular baseband modems.

As used herein, the term "transmit", "receive", "transmission" and "reception" generically refer to techniques for sending, passing, and receiving data. For example, consider a mobile device in communication with a cloud based service; the mobile device "transmits" and "receives" data with the cloud based service. As used herein, the term "delivery" specifically refers to the transfer of data from one communication layer to its peer communication layer or an immediately adjacent layer within its own stack. For example, consider a mobile device having a modem and application processor that are coupled via an IPC link; the modem's data link layer "delivers" data link layer packets to an application processor's data link layer. Similarly, the modem's data link layer "delivers" network link layer packets to its own network link layer, etc.

Figure 5A:
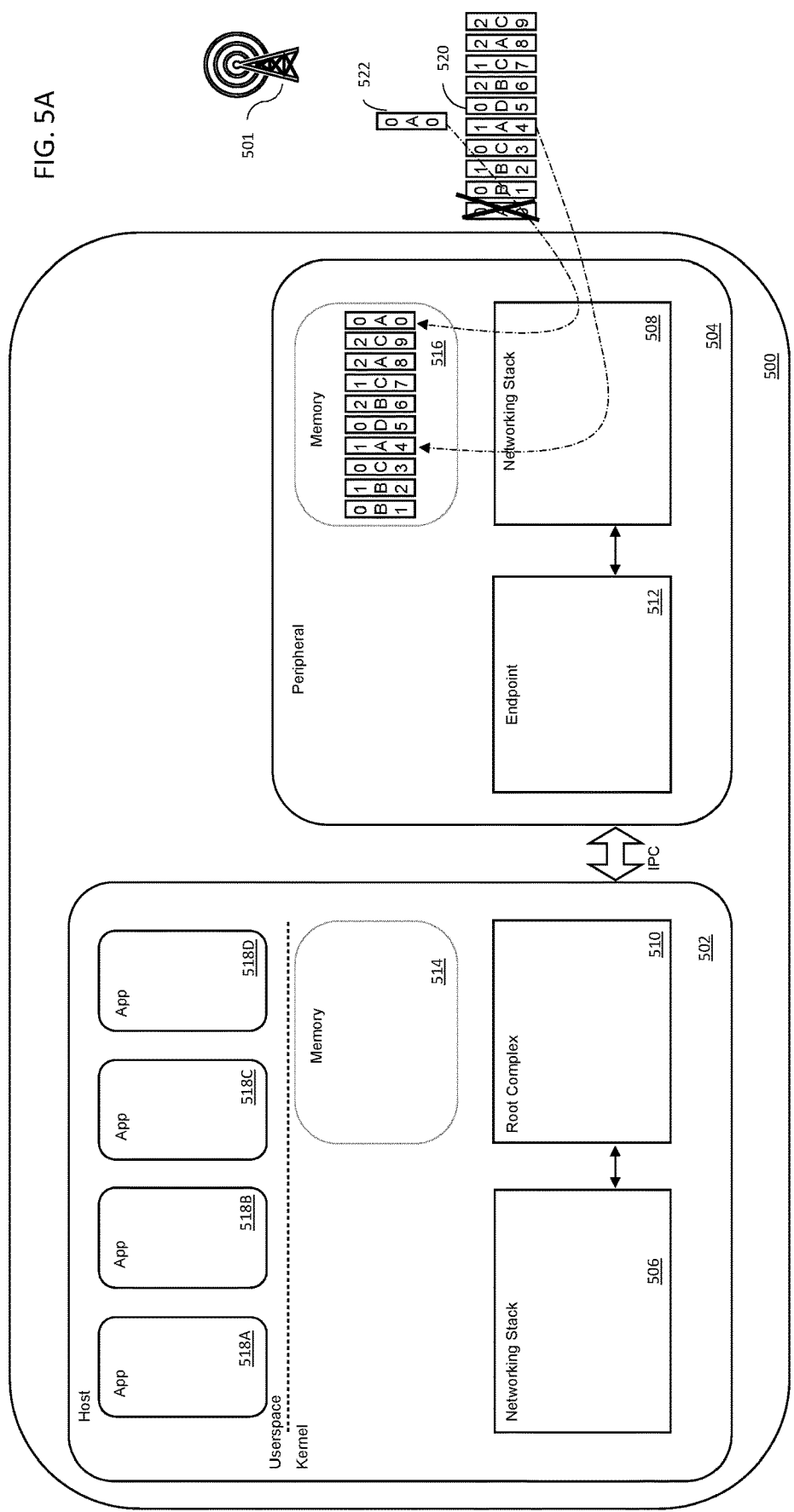
FIGS. 5A-5D are logical representations of an exemplary prior art apparatus, useful for explaining prior art packet delivery schemes.

As shown in FIG. 5A, a user device 500 is in data communication with a wireless network 501. Common examples of user devices include without limitation smartphones, smartwatches, tablets, laptops, phablets, portable media players, smart home device (including use in conjunction with the so-called Internet of things (IoT)), and other mobile devices have become ubiquitous in everyday life. The user device 500 includes a host processor 502 for the kernel (operating system (OS)) and applications 518, and a peripheral processor 504 for communicating with a wireless network 501. The host processor executes a network communications stack 506 from the kernel, which communicates with the peripheral processor's communication stack 508, via an inter-processor communication (IPC) link, with an IPC root complex (RC) 510 and endpoint (EP) 512. The host processor has a memory 514 for storing packet data received from the peripheral processor during transit. The peripheral processor has a memory 516 for storing packet data received from the wireless network 501 during transit. For the purposes of clarity, in the following example, each illustrated data packet corresponds to one (1) data link layer packet encapsulating one (1) network layer packet, further encapsulating one (1) transport layer packet. As shown, each of the illustrated data structures includes the corresponding layer information of the packet; e.g., a data link layer (L2) sequence (denoted in the range 0-9), and an L4 header that includes a L4 port (denoted in the range A-D), and an end-to-end L4 sequence (denoted in the range 0-2).

For reasons discussed in greater detail infra, the network layer address may also be considered part of the L4 header. Notably, each L4 port data interface is associated with a single L3 address, and an associated running sequence number L4. Thus, the combination of L3 address information (A-D) along with L4 sequence information (0-2), uniquely identifies a single packet payload. As a practical matter, since L3 network addresses are routed to L4 port numbers and L4 sequence numbers are virtually always used together, the combination of L4 port numbers and L4 sequence number is also commonly referred to as an "L3/L4 packet" (common examples include e.g., TCP/IP packet, etc.) For example, consider a data link layer packet which is sent between adjacent data link nodes at sequence order 9; as shown, this "L2 packet" corresponds to an "L3 packet" or "L4 packet" that is addressed to L4 port C with an endpoint-to-endpoint sequence number of 2.

Artisans of ordinary skill in the related arts will readily appreciate that the foregoing 1:1:1 mapping is purely illustrative; during practical operation, packets of a first layer will span a multiple or a subset of packet of a second layer e.g., the packet mapping may be X:Y:Z. Thus, a data link layer (L2) packet may contain single, partial, or multiple network layer (L3) packets; similarly, even though L3/L4 packets are typically 1:1, other implementations may map a single network layer packet (L3) to single, partial, or multiple transport layer (L4) packets. While the present disclosure is directed to a specific hierarchy of layers, artisans of ordinary skill in the related arts given the contents of the present disclosure will readily appreciate that the various aspects described herein may be applicable to technologies that are not so constrained.

During prior art operation, the peripheral processor 504 receives data packets 520 over-the-air from the wireless network at a first time ($t_0$). The peripheral processor 504 networking stack 508 stores the data link layer (L2) packets within memory 516. As shown, data link layer packet 0 is lost during an initial transfer. The networking stack 508 identifies the missing data link layer (L2) packet and requests a re-transmission at a subsequent time ($t_1$); the peripheral processor 504 must wait until it receives the missing data link layer (L2) packet. The base station receives the re-transmission request and re-transmits the corrupted data link layer (L2) packet at re-transmission time ($t_2$) 522. Once the peripheral processor 504 has received the re-transmission of data link layer 0 at re-transmission time (t2) 522, the peripheral processor 504 can re-order the received data packets.

Figure 5B:
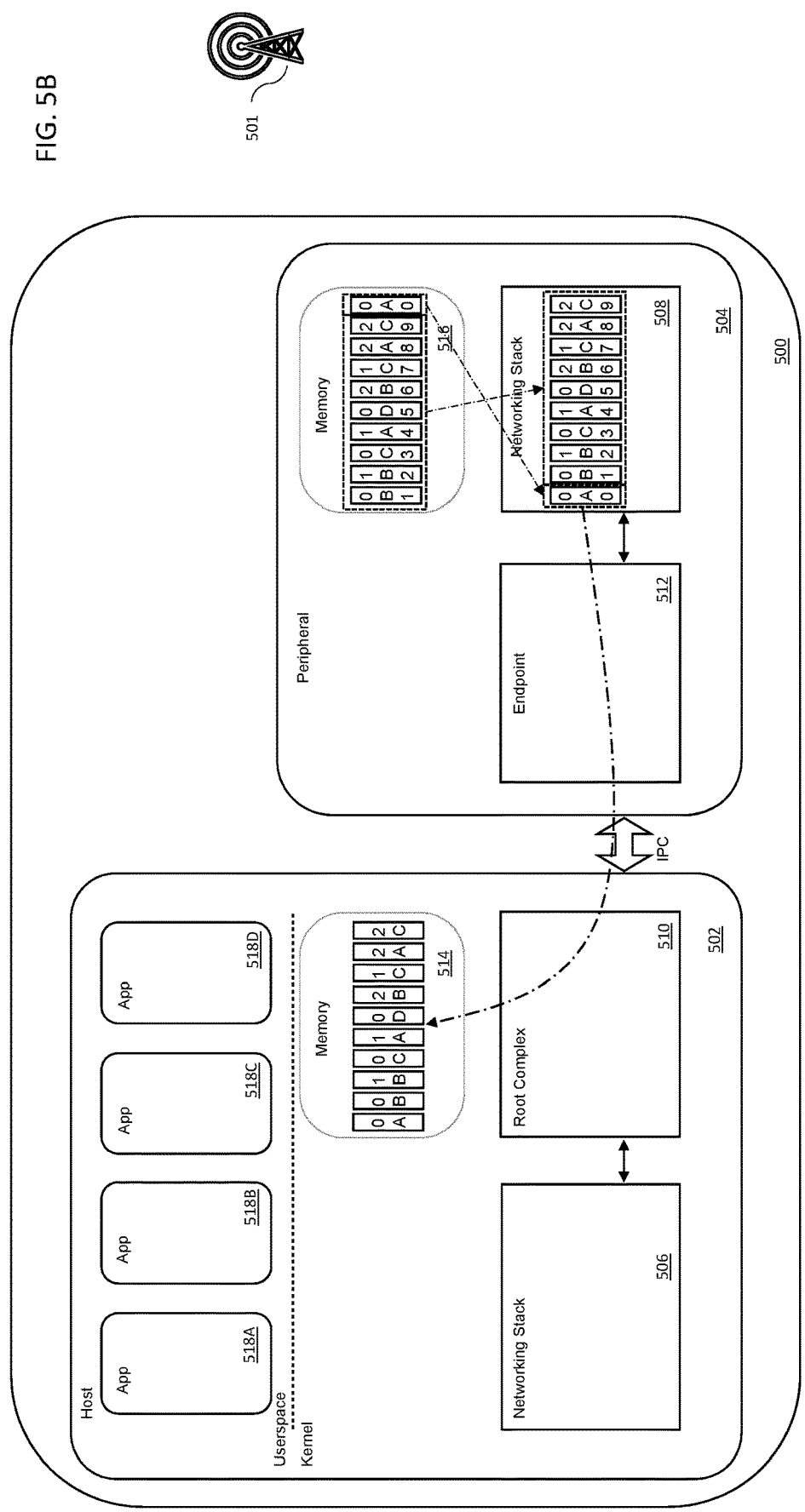

Referring now to FIG. 5B, once all of the data link layer (L2) packets have been received, the networking stack can re-order the data link layer (L2) packets properly, thereafter the network layer (L3) packets can be parsed. The networking stack 508 determines the destination address of the network layer (L3) packets (based on the network address information of the network layer (L3) packets; these addresses correspond to applications 518) and routes the network layer (L3) packets to the next "hop" i.e., networking stack 506. The network layer (L3) packets are transferred via the IPC link (e.g., endpoint 512 and root complex 510), and written into host memory 514 (DRAM).

In FIG. 5B, the over-the-air L2 information is removed. While not expressly shown, it is appreciated that the IPC link performs its own communication stack and delivery (e.g., the IPC provides an L2 link between the application processor and the baseband). For example, the root complex 510 and endpoint 512 also perform formatting, parsing, and may additionally provide similar functionality as to error-free delivery, (e.g., the IPC may implement similar re-transmission schemes if necessary.)

Figure 5C:
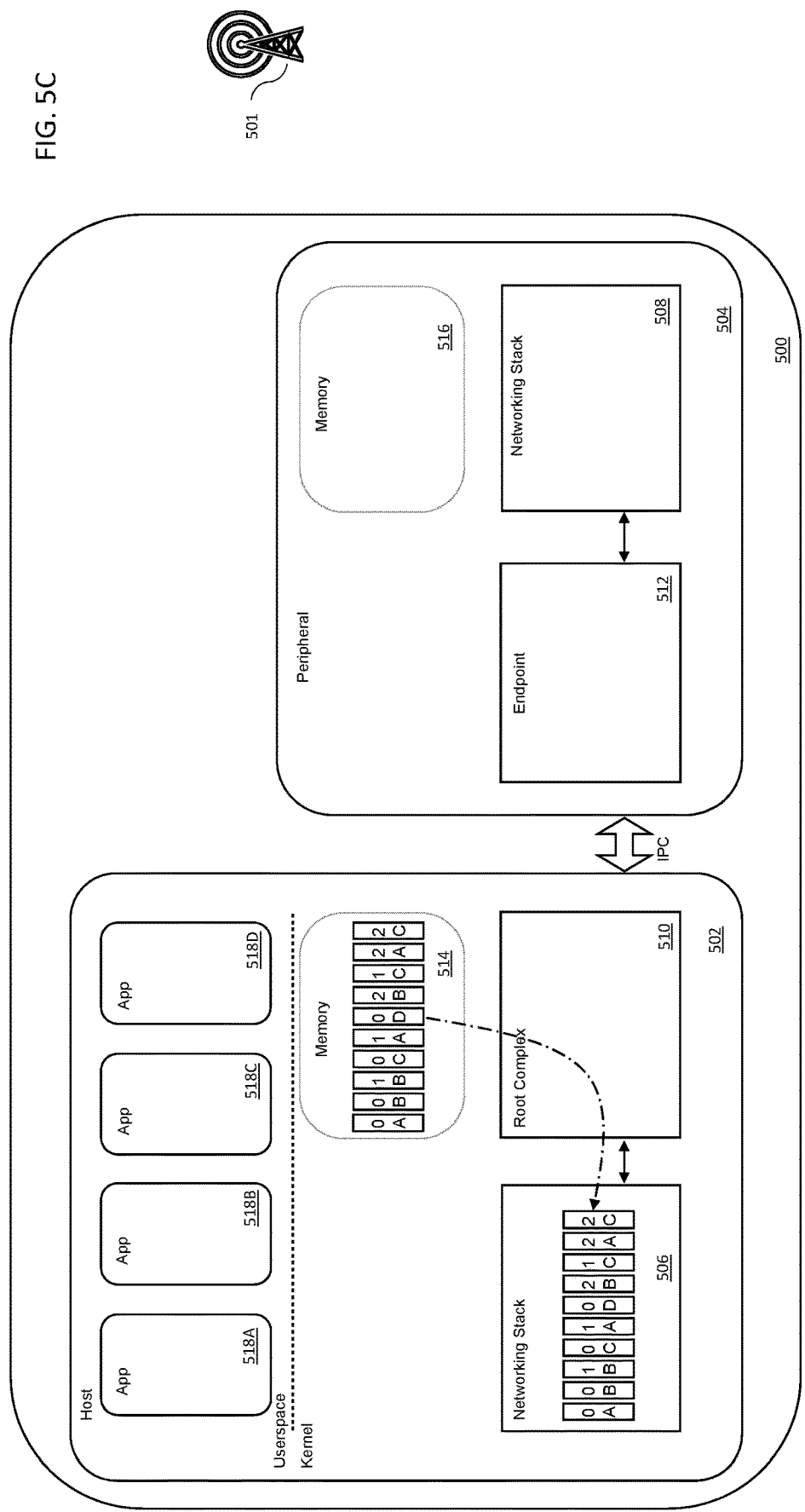
Figure 5D:
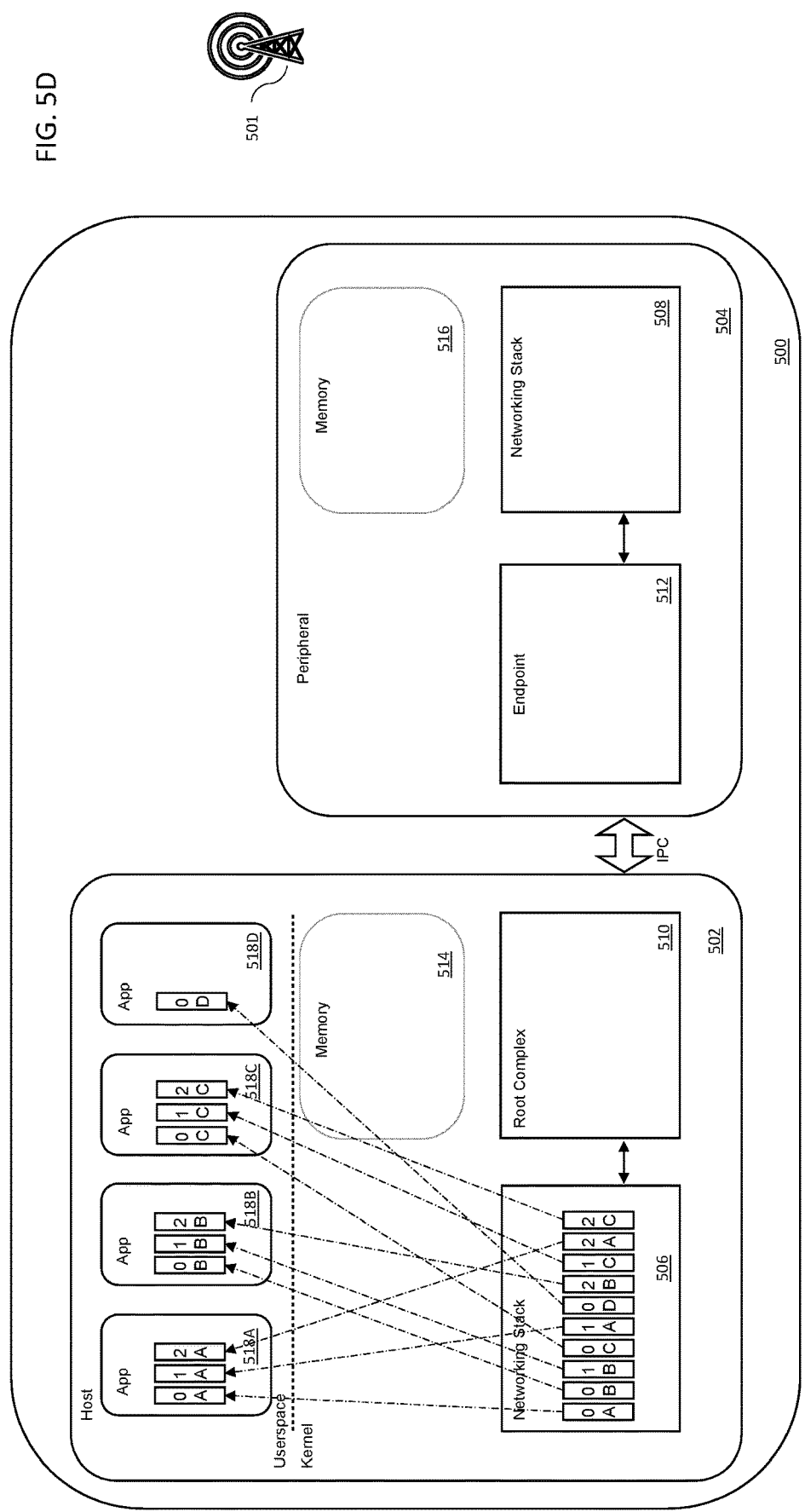

At FIG. 5C, once the data has been successfully transferred into host memory 514, the host processor can parse the data with its networking stack 506. Specifically, the networking stack 506 can parse the data packets to extract the relevant network layer (L3) address and transport layer (L4) sequence. The payloads are provided to their respective applications 518A, 518B, 518C, and 518D (see FIG. 5D) based on the network layer address, and in the transport layer sequence. As used herein, the term "parse" and "parsing" refers to the process of dividing a data structure of data objects (such as a string or array of symbols) into its constituent data objects. For example, in this case, the data stored in host memory 514 is parsed for network layer addressing and transport layer sequence.

The prior art packet delivery scheme re-uses existing well-understood network protocols, software, and hardware and provides reliable delivery. However existing solutions suffer from a number of problems. For instance, as expressly shown in FIGS. 5A and 5B, if one or more data link layer (L2) packets between the modem and the wireless network are missing or otherwise corrupted (i.e., a "hole" in the data link layer sequence), then the modem waits to process the network layer and/or transport layer data packets until after the missing data link layer packet is received.

Notably, a significant portion of correctly received network layer (L3) and transport layer (L4) packets were received correctly the first time and were unrelated to the missing data link layer (L2) packet. For example, the second data packet which is sent between adjacent data link nodes at sequence order 1, corresponds to a L3/L4 packet addressed to L4 port B, with an endpoint-to-endpoint sequence of 0, and is unrelated to the first data packet. The network and transport layer information of the second data packet does not rely on the missing data link layer information of the first data packet. In fact, the network and transport layer information for nine (9) packets corresponding to applications 518B, 518C, and 518D were delivered correctly the first time, but only data link layer packets 4 and 8 are addressed to the same L4 port (A). In other words, the first data packet's data link layer (L2) hole introduces a "head-of-line" blocking problem for each of the subsequent data packets which are not addressed to the same L4 port (or destination).

Holding data link layer packets directly affects real-time operation and/or memory allocation. Specifically, the system of FIGS. 5A-5D requires a large memory within the peripheral processor 504 to hold the incomplete sequence of data packets until the missing data link layer packet hole is filled. Larger memories are undesirable since they increase the manufacturer's bill of material (BOM) costs and only provide negligible or disproportionately small improvements to consumer experience. For reference, a 5th Generation (5G) cellular modem may require ~60 Mbytes (60 MB) of memory.

Moreover, within the context of certain implementations (such as the aforementioned IPC bus technology), the high throughput burst data delivery of the system 500 is undesirable. For example, some host networking stacks are not capable of handling large data transfers; this can result in overflow conditions (e.g., user datagram protocol (UDP) socket buffer overruns).

Figure 6A:
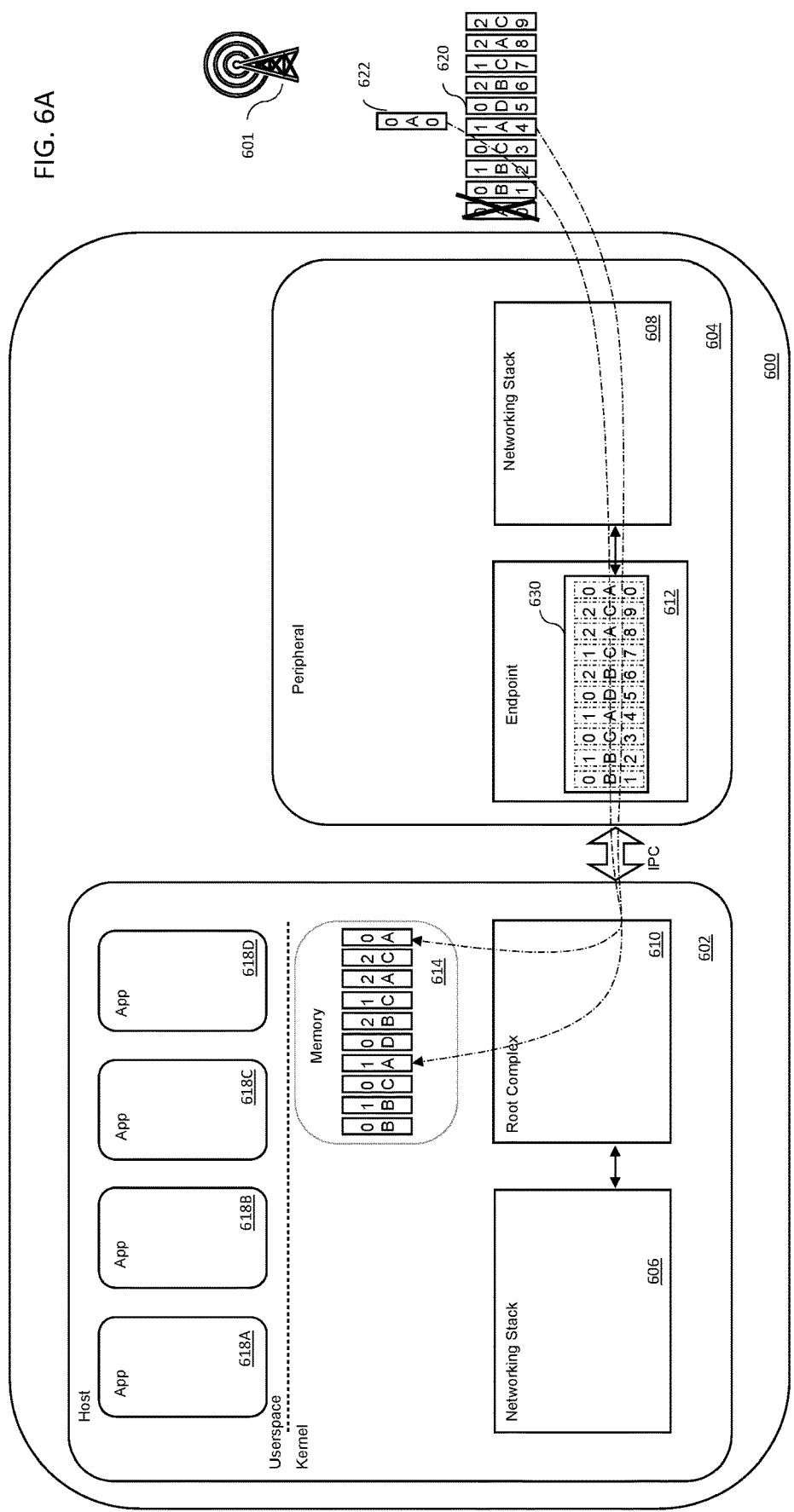
FIGS. 6A-6C are logical representations of an exemplary prior art apparatus, useful for explaining other prior art packet delivery schemes.
Figure 6B:
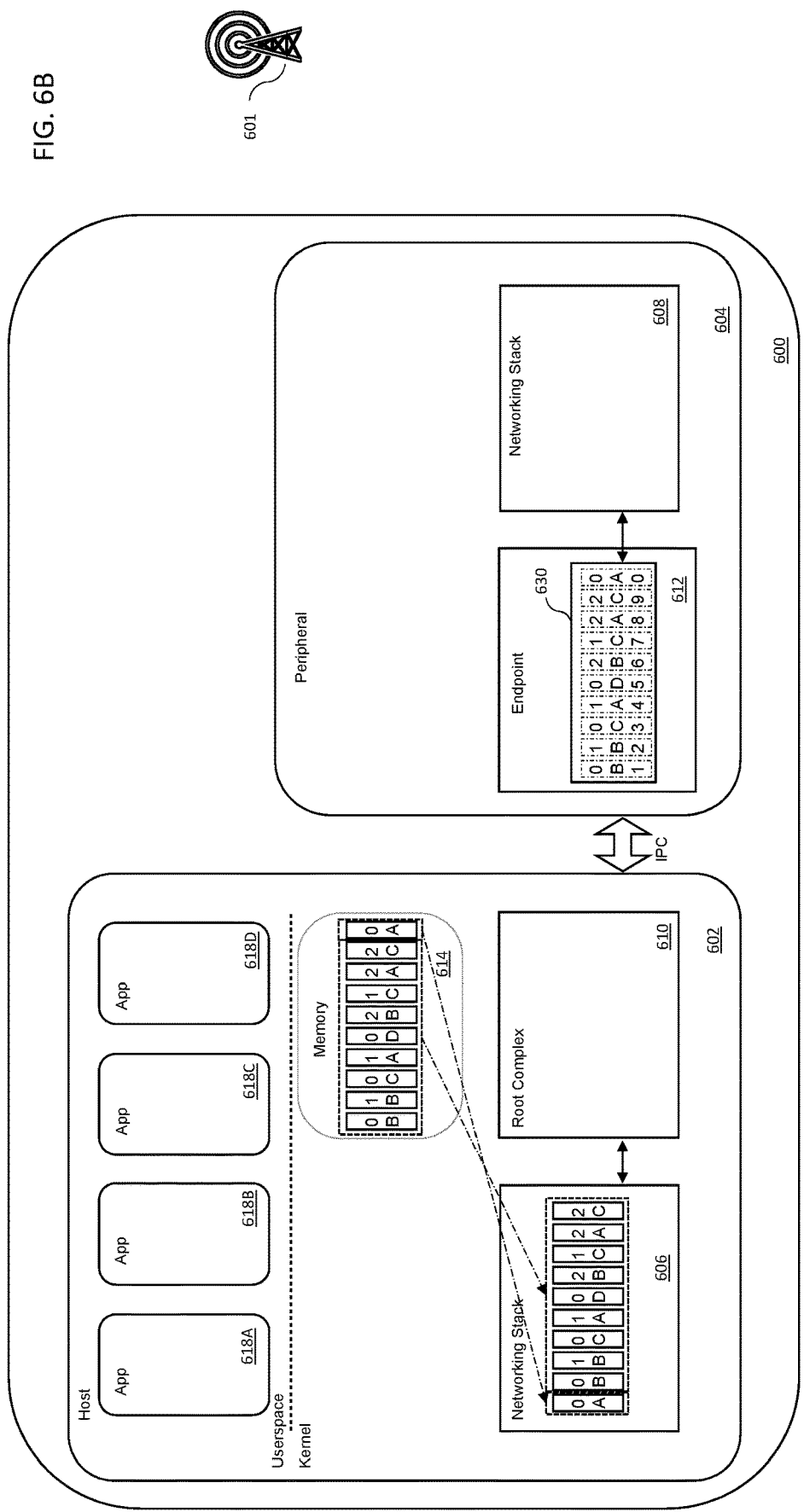
Figure 6C:
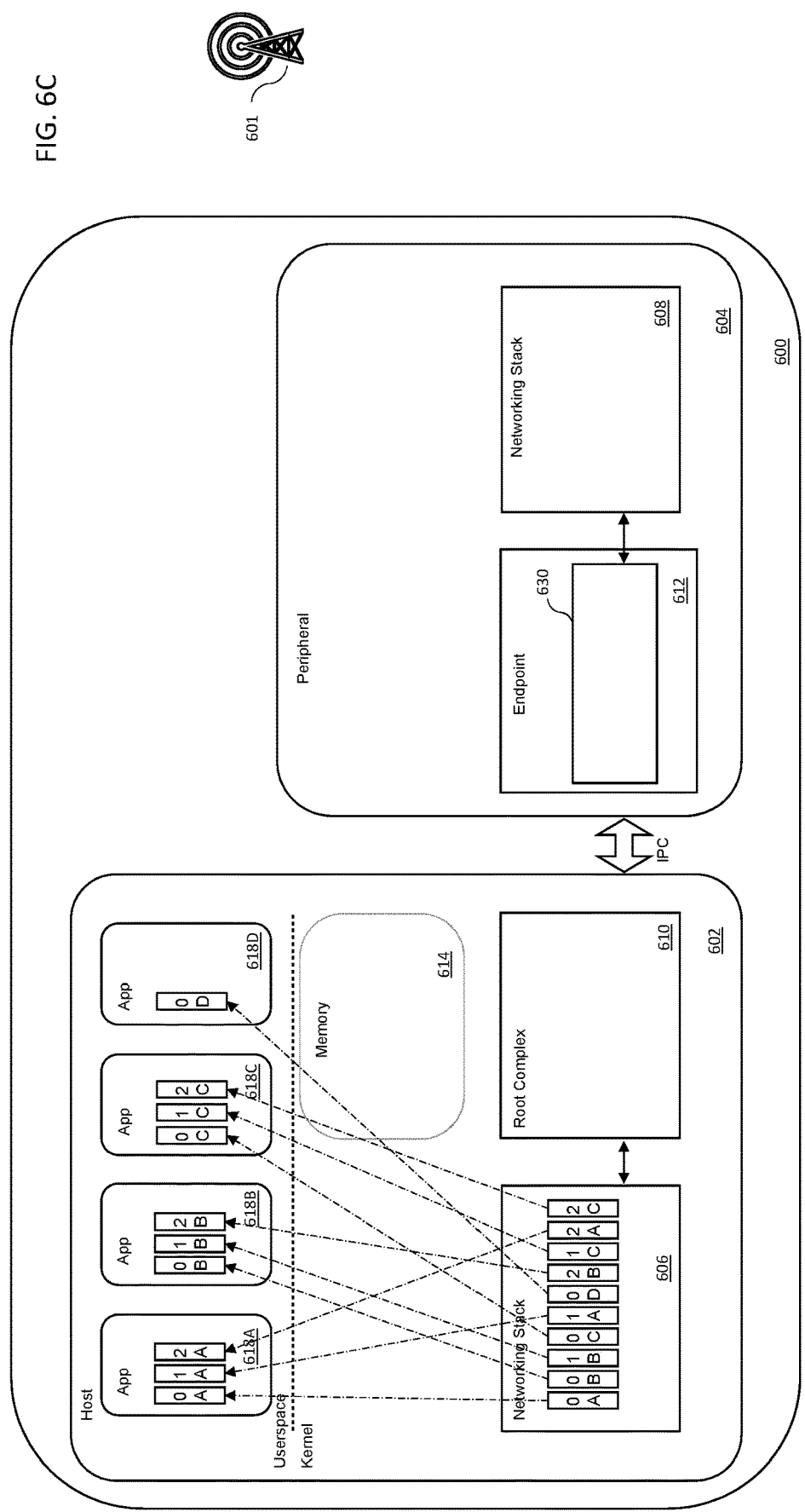

FIGS. 6A-6C are logical representations of an exemplary prior art apparatus, useful for explaining another prior art packet delivery scheme. Similar to the architecture of FIGS. 5A-5D, FIGS. 6A-6C depicts a user device 600 in data communication with a wireless network 601. The user device 600 includes a host processor 602 for the kernel (operating system (OS)) and applications 618, and a peripheral processor 604 for communicating with a wireless network 601. The host processor executes a network communications stack 606 from the kernel, which communicates with the peripheral processor's communication stack 608, via an inter-processor communication (IPC) link, with an IPC root complex (RC) 610 and endpoint (EP) 612. The host processor has a memory 614 for storing packet data received from the peripheral processor during transit.

Unlike FIGS. 5A-5D, the peripheral processor of FIGS. 6A-6C directly writes into the host memory 614 or external DRAM, thereby reducing the peripheral processor's own memory requirements. In one such implementation, the networking stack 608 locally stores pointers in a small memory 630; the pointers can be dereferenced to network packet data in the host memory 614. In one common implementation, the L2 (IEEE 802.11) information is removed for storage; i.e., only the L3/L4 packets are stored. By only storing pointers to the received data packets rather than the entire data link layer packet, the memory 630 can be substantially smaller than e.g., the peripheral processor memory 516 of FIGS. 5A-5D. In fact, in some implementations, the memory 630 can be a repurposed or reused portion of e.g., the endpoint 612. Such a scheme is commonly employed in commodity type components where bill of material (BOM) cost is a significant factor e.g., wireless local area network (WLAN) modems and other low rate component devices.

As in FIG. 5A the peripheral processor 604 of FIG. 6A receives data packets 620 over-the-air from the wireless network at a first time ($t_o$). The peripheral processor 604 networking stack 608 stores the L3/L4 packets within host memory 614 and a corresponding pointer within local memory 630. As before, data link layer packet 0 is lost during an initial transfer. The networking stack 608 identifies the missing data link layer (L2) packet and requests a re-transmission at a subsequent time (t1); the peripheral processor 604 waits until it receives the missing data link layer (L2) packet at re-transmission time (t2) 622. Once the peripheral processor 604 has received the re-transmission of data link layer 0 at re-transmission time (t2) 622, the peripheral processor 604 can indicate that the transfer is complete to the host processor and provide the pointer information stored in 630.

Referring now to FIG. 6B, the peripheral processor's still has the burden of re-ordering the data stored in host memory 614, based on the pointer information received via memory 630. This allows the host IPC to release the L3/L4 packets in the right order to the network stack. In other words, the burden for re-ordering has not been obviated. More directly, the host networking stack 606 still requires the relevant network layer (L3) address and transport layer (L4) sequence information for networking.

Once received at the networking stack 606, the networking stack parses the L3/L4 packets and routes them to their respective applications 618A, 618B, 618C, and 618D (see FIG. 6C).

As previously alluded to, the scheme of FIGS. 6A-6C is suitable for systems that use a peripheral processor with less memory (such as commodity type WLAN processors). However, these burdens only shift from the peripheral to the host processor. Shifting the memory burden does not address the aforementioned head-of-line issues e.g., stalled delivery of data packets that have been successfully received, nor does it address the high throughput burst data delivery problems. Additionally, while the peripheral processor does not need to store the data link layer packets itself, the peripheral processor still has some re-ordering logic responsibility (see e.g., FIG. 6B and associated discussion regarding pointers). In particular, the peripheral processor still tracks when all of the data packets have been correctly received, and must notify the host processor at the appropriate time.

Moreover, the aforementioned subset of peripheral processor logic is difficult to implement in hardware, and requires specialized or proprietary software handling instead. As a practical matter, manufacturers that can source components from multiple vendors increase competition in the component markets which can drive the price of components down. The proposed solutions of FIGS. 6A-6C have only been implemented by a relatively limited group of $3^{rd}$ party component manufacturers. The non-uniform implementation of out-of-order delivery solutions can result in less competitive markets and/or limited component compatibility. Piecemeal adoption may also complicate systems where a host processor interfaces with multiple peripheral processors. For example, a host that is coupled to both a peripheral that supports the reduced memory footprint delivery (e.g., a WLAN modem) and a peripheral that does not (e.g., a cellular modem) would need to support both types of delivery. Thus, only the reduced memory footprint peripheral is benefited at additional cost to the host processor (and the rest of the device ecosystem).

As illustrated above, neither systems 500 or 600 address the underlying "head-of-line" issues that affect device performance.

Example Operation

FIGS. 7A-7D are logical representations of one exemplary apparatus configured to deliver data packets non-sequentially.

Figure 7A:
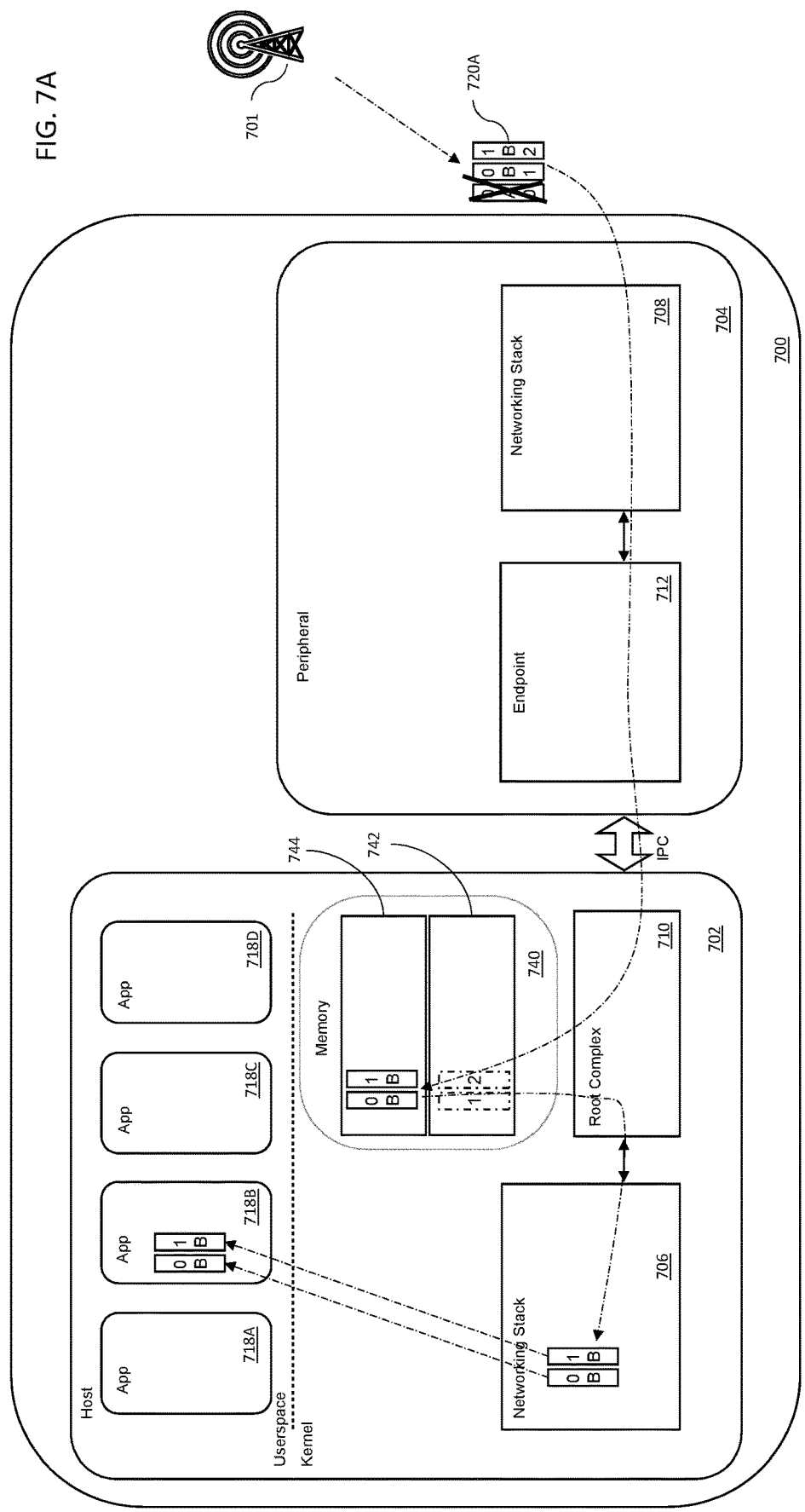

FIG. 7A depicts an exemplary apparatus 700 in data communication with a wireless network 701. The exemplary apparatus 700 includes a host processor 702 for the kernel (operating system (OS)) and applications 718, and a peripheral processor 704 for communicating with a wireless network 701. The host processor executes a network communications stack 706 from the kernel, which communicates with the peripheral processor's communication stack 708, via an inter-processor communication (IPC) link, with an IPC root complex (RC) 710 and endpoint (EP) 712.

Unlike the previous systems of FIGS. 5A-5D and 6A-6C, the host processor's networking stack 706 and memory 740 are configured to track when data packets of a first layer provide enough information for a second layer to enable non-sequential delivery to that second layer. In one exemplary embodiment, the peripheral processor will continue to deliver data link layer (L2) packets that contain sufficient higher layer information (e.g., network layer (L3) packets). More directly, prior art techniques reconstruct network layer packets (and transport layer packets) from a sequenced arrangement of all data link layer packets. In contrast, the exemplary apparatus 700 identifies the subset of network layer packets that are addressed to each application 718, and delivers the subset of network layer packets that are complete "earlier" than would otherwise be possible (e.g., a so-called "data flow" of network addressed and transport sequenced payloads in ascending, but not necessarily data link layer order).

In the illustrated exemplary embodiment, the memory 740 is structured to store data link layer packet payloads in the order of reception over-the-air in a first memory allocation 744 and pointers to data link layer packet sequence in a second memory allocation 742. In one such implementation, the memory structure 744 corresponds to the aforementioned TDR (see also Exemplary Inter-Processor Communications Link, described supra), and a data structure 742 for storing networking metadata (L2 "hint" information discussed in greater detail hereafter). Other interface technologies (e.g., USB, Ethernet, PCIe and/or any other inter-processor communication) may use different data structures, the foregoing being purely illustrative.

As used herein, the "hint" information refers to metadata regarding received data packets that identifies one or more networking parameters. In one exemplary embodiment, hint information is a data link layer sequence associated with the over-the-air communication (the over-the-air communication stack is a different communication stack from the IPC communication stack). The hint information conveys how the data payload was previously formatted e.g., over-the-air, and can be parsed according to existing networking stack data (based on e.g., header and trailers). Hint information can be parsed either by the peripheral (e.g., while writing the data to the memory 744) and/or as a host process.

In other embodiments, the hint information is merely a copy of the existing packet header/trailer data. In still other embodiments, hint information may be a pre-processed variant (identifying various other packet information e.g., type packet, size of the packet, address, sequence, tags, flags, remaining count, and/or any other metadata or data associated with each packet). Various other types of hint information may be substituted with equivalent success by those of ordinary skill, given the contents of the present disclosure.

For example, as shown in FIG. 7A, the peripheral processor's networking stack 708 receives data link layer packets 720A during a first transmission. The first transmission 720A includes data link layer packets 0, 1, and 2. However, data link layer packet 0 is irrecoverably lost in transmission. The peripheral processor networking stack 708 directly writes L3 packets with over-the-air L2 sequence number 1 and 2 to the host memory allocation 744 with corresponding over-the-air L2 sequence number (hint information) and immediately rings the host processor. The host processor's networking stack 706 retrieves the L3 packets with L4 port B and sequence number 0 and 1 from host memory 744 and obtains hint information in data structure 742.

The host processor's networking stack 706 determines that the data flow of the received L3 packets 0 and 1 can be immediately delivered to the corresponding applications 718 based on the L4 headers (e.g., L4 port number and L4 end-to-end sequence). Specifically, the data payloads are addressed to a valid network layer (L3) packet and there is no transport layer (L4) sequence "hole". In other words, the missing data link layer packet 0 is only a "hole" for the data link layer (L2). While the aforementioned data flows correspond to an ascending non-sequential order (e.g., from lowest to highest), artisans of ordinary skill in the related arts will readily appreciate given the contents of the present disclosure, that other data flows may be substituted with equivalent success; for example, descending (from highest to lowest) or "clumped" orders (any arbitrary order within a set).

Once L3 packets 0 and 1 are delivered, memory 744 can be cleared. Notably, the hint information stored in memory 742 is retained for subsequent processing. Early non-sequential delivery of L3 packets 0 and 1 reduces the overall processing and memory burden of head-of-line issues. Additionally, by immediately transferring smaller data flows, the device does not suffer from high throughput burst data delivery problems.

Figure 7B:
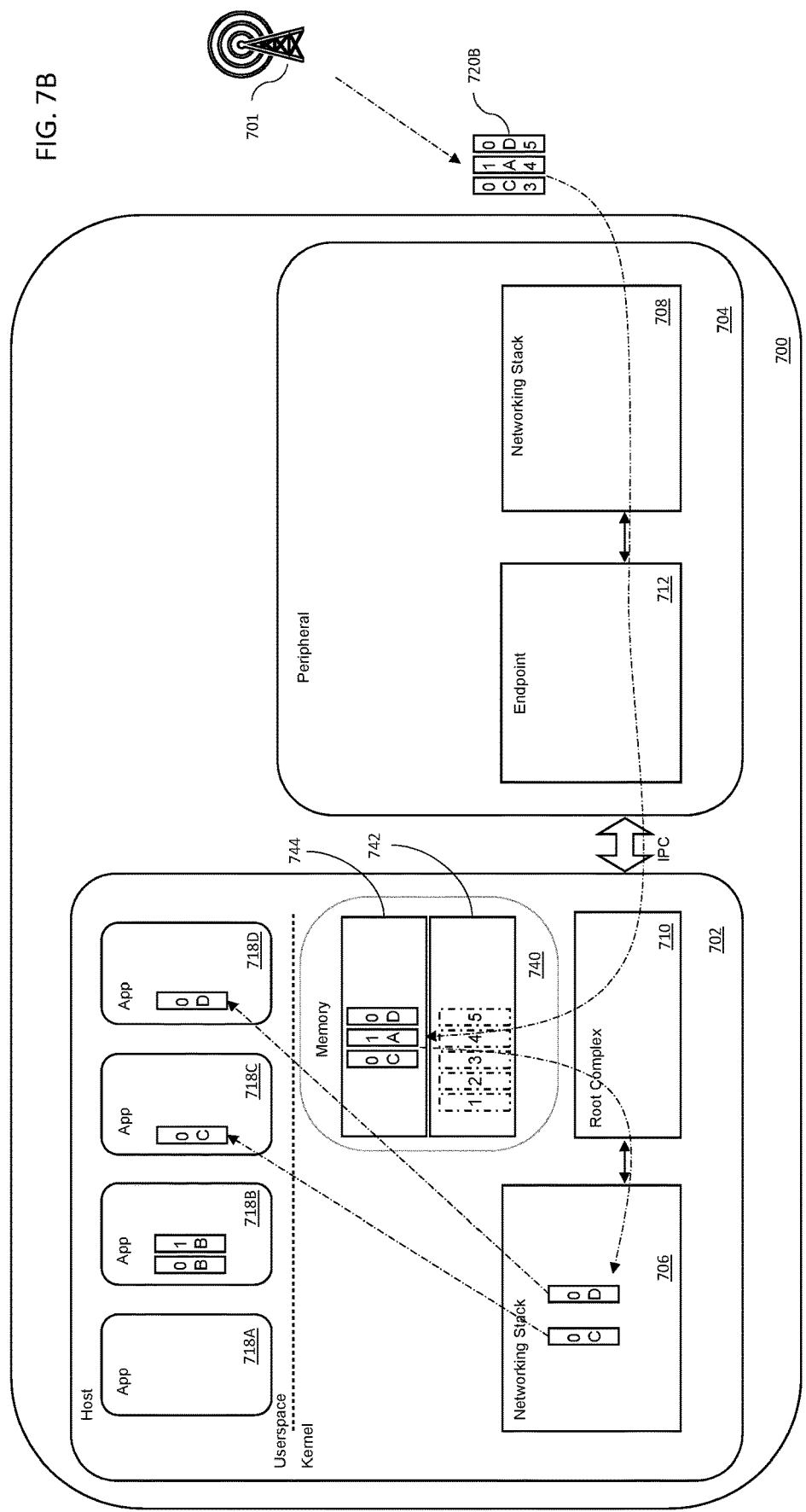

Referring now to FIG. 7B, the peripheral processor's networking stack 708 receives data link layer packets 720B during a second transmission. The second transmission 720B includes data link layer packet 3, 4, and 5, each of which is correctly received. The peripheral processor networking stack 708 directly writes L3 packets with over-the-air L2 sequence numbers 3, 4, and 5 to the host memory allocation 744 with associated hint information in data structure 742 and immediately rings the host processor. The host processor's networking stack 706 parses the L3 packets with L2 "hint" sequence number 3, 4, and 5, and associated hint information.

The host processor's networking stack 706 determines L3 packets with L2 "hint" sequence numbers 3 and 5 which correspond to applications 718C and 718D respectively can be routed (e.g., based on L4 header information). However, L3 packets with L2 "hint" sequence number 4 cannot be delivered; in particular, packet 4 corresponds to L4 port A, end-to-end sequence 1. The retained hint information within data structure 742 does not include an end-to-end sequence 0 for L4 port A; consequently, L3 packet 4 is held in memory 744 (waiting for the re-transmission of L3 packets with L2 sequence number 0). More directly, the networking stack 706 may deduce that the missing L2 packet corresponds to the missing L4 port A, sequence number 0. As a result, the networking stack does not forward the packet to application or end destination (it waits for the missing information).

Figure 7C:
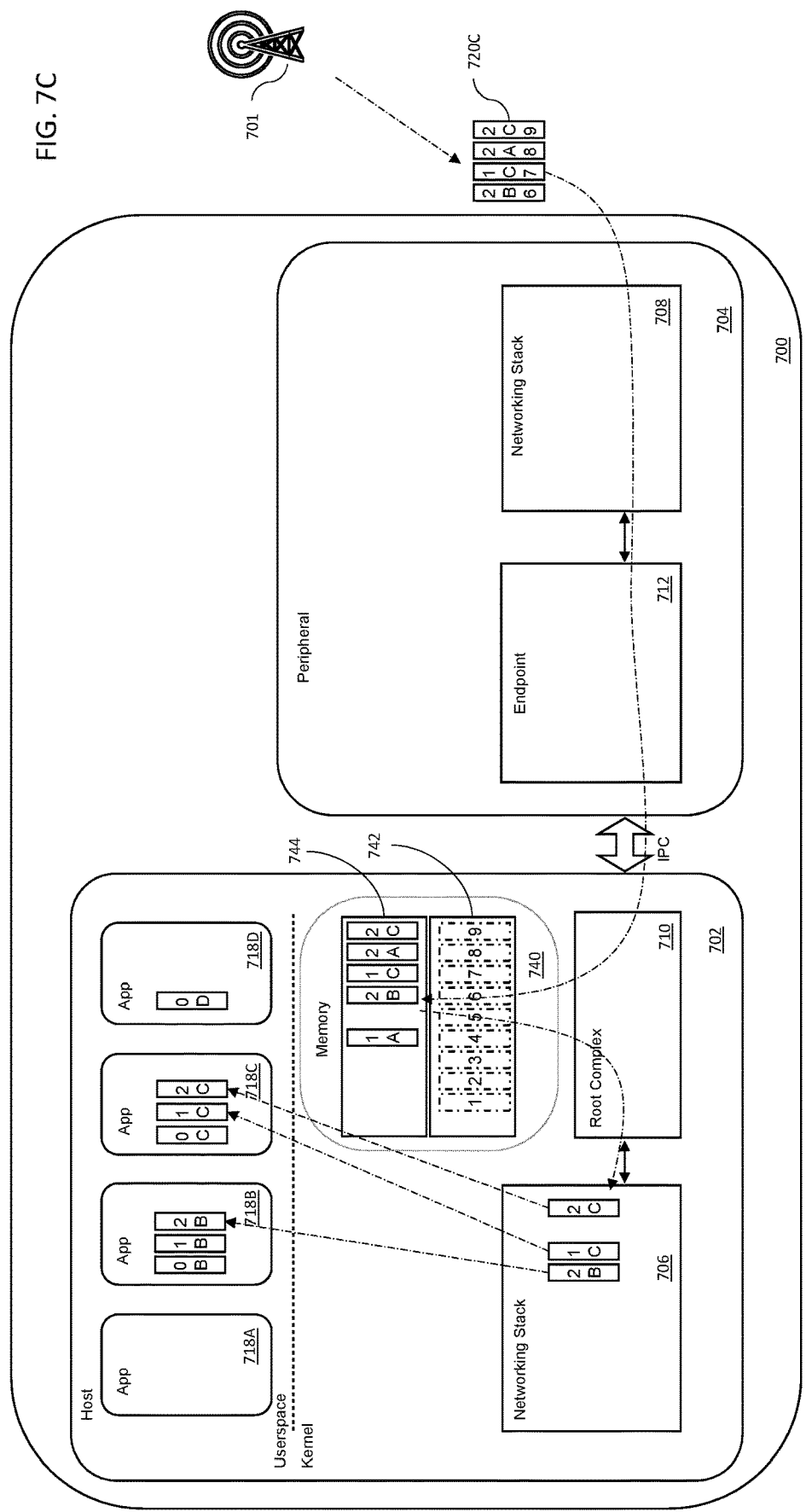

In FIG. 7C, the peripheral processor's networking stack 708 receives data link layer packets 720C during a third transmission. The third transmission 720C includes data link layer packets 6, 7, 8, and 9, each of which is correctly received and the L3 packets are written to memory 744; as before, the host processor parses for hints and determines that L3 packets with over-the-air L2 sequence numbers 6, 7, and 9 can be delivered in the aforementioned manner.

Referring now to FIG. 7D, the peripheral networking stack 708 recognizes that data link layer packet 0 was lost. The networking stack 708 requests a re-transmission at time (t1); the peripheral processor 704 waits until it receives the missing data link layer (L2) packet 0 at re-transmission time (t2) 722. Once the peripheral processor 704 has received the re-transmission of data link layer 0 at re-transmission time (t2) 722, the peripheral processor 704 can indicate that the transfer is complete to the host processor. In some alternate implementations, identifying the missing packet and issuing the re-transmission request may be performed by the host networking stack.

In FIG. 7D, the host processor's networking stack 706 receives the L3 packet with L2 sequence number 0 re-transmission. The host processor's networking stack 706 determines that there is no missing intervening packet before or between L3 packets with over-the-air L2 sequence numbers 0, 4, and 8. Thus, the host processor's networking stack 706 forwards the retrieved L3 packets with over-the-air L2 sequence numbers 0, 4, and 8 to application 718A. Thereafter, the memory 744 and 742 can be cleared.

The aforementioned system 700 of FIGS. 7A-7D provides several benefits over previous solutions. Firstly, the memory requirements for the peripheral processor and host processor are very low. In particular, the peripheral processor can operate within a substantially smaller memory footprint compared to prior art solutions because the peripheral processor can deliver packet data as they arrive and does not have any re-ordering responsibility. Additionally, the host processor can also reduce its memory footprint because it can deliver data packet payloads immediately and free its memory as quickly as possible. As a related benefit, applications that are unrelated to L2 "holes" can receive data immediately (rather than waiting for the re-transmission of the unrelated L2 hole) and thus the overall network latency can be greatly reduced and user experience can be improved.

Furthermore, the data structure 742 provides a simple and straightforward method to track holes. In particular, the host and/or peripheral networking stack can efficiently determine missing data packets by reviewing the same condensed hint data structure. Specifically, the networking stacks 706 and/or 708 need only reference the data structure 742 in order to identify packets that have failed delivery.

As noted in the foregoing discussion of system 600, the peripheral processor's 704 operation can be simplified to first-in-first-out (FIFO) transfer based buffer management because there is no requirement for re-ordering. However, an additional benefit of the system 700 over system 600 is that all of the re-ordering logic can be performed in the host processor, based only on L2 hint information from the peripheral processor. More directly, the peripheral processor does not need to track when all data link layer packets have arrived in order to send the completion signaling (refer back to the discussion of FIG. 6C). The simplified peripheral functionality can be implemented within technologies that must operate under very limited processing, memory, and/or power constraints. The simplified peripheral functionality is also necessarily performed only in the lower software layers of any networking stack; minimal changes to firmware and/or software are sufficient to provide the aforementioned hint information to the system 700, and the lower software layers can directly provide over data link layer packets natively. By ensuring that the re-ordering logic is limited to the host processor, a much broader variety of peripheral processor technologies can be supported with equivalent success (obviating the aforementioned concerns for single sourcing and multi-component level support).

Flushing Optimization

As a brief aside, some prior art technologies throttle data rates based on inferred network congestion. Consider the typical scenario where a TCP receiver receives a stream of TCP packets from a TCP transmitter. The TCP packets are ordered according to an endpoint-to-endpoint sequence; so if the TCP receiver misses some packets, it will send NACK responses to the TCP transmitter. The TCP transmitter infers that the packets were lost due to network congestion; consequently, the TCP transmitter will slow its packet rate down until the inferred congestion event passes. Usually, TCP rate throttling benefits the network holistically since slowing down data transmissions relative to data reception allows the congested network to "drain" out.

Within the context of the foregoing disclosure, the existing TCP rate throttling technique may be optimized with some modifications. In particular, various embodiments of the present disclosure deliver TCP data packets without waiting for complete data link layer or network layer packet delivery. As a practical matter, this can distort the TCP layer perception of network congestion. In other words, unlike prior art network stacks that only deliver TCP packets after all of the packets corresponding to the data link layer and network layer have been correctly received, various embodiments of the present disclosure provide TCP packets in a non-sequential manner (e.g., earlier than is possible with prior art delivery). Moreover, the data link layer is aware of when a data link layer hole is irrecoverable and should trigger re-transmissions. As a result, legacy TCP timeout/re-transmission intervals are longer than is necessary for devices capable of early delivery.

To these ends, various embodiments of the present disclosure enable the peripheral processor to immediately notify the host processor when a first layer (e.g., the data link layer) has failed in a manner that will cascade to other layers (e.g., the transport layer). For example, once a data link layer failure will require TCP re-transmission anyway, there is no reason to wait for the TCP layer timeout. Instead, the peripheral processor can notify the host processor that any currently missing TCP holes should be immediately flushed and to initiate the TCP re-transmission process.

Methods

Figure 8:
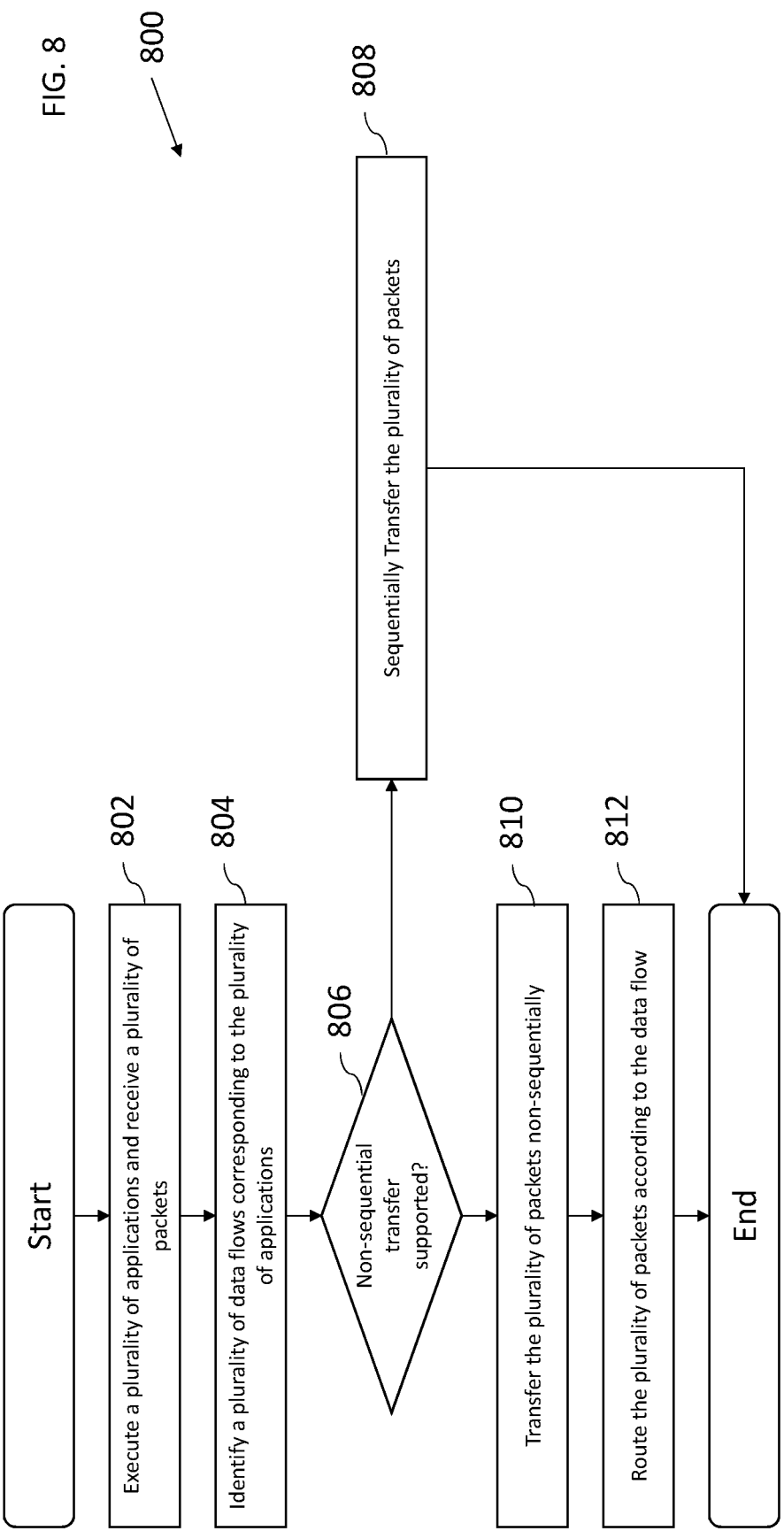
FIG. 8 is a logical flow diagram of one generalized method for non-sequential packet delivery, in accordance with various aspects of the present disclosure.

FIG. 8 is a logical flow diagram of one generalized method for non-sequential packet delivery. In one exemplary embodiment, the method enables the early delivery of data packets. Various other embodiments may use non-sequential delivery to enable reduced power consumption and/or to moderate spikes or dips in power consumption. Still other embodiments may advance or retard packet delivery so as to achieve prioritized data delivery and/or guarantee certain performance requirements e.g., maximize data throughputs or minimize data latency.

At step 802 of the method 800, a first processor executes a plurality of applications and a second processor receives a plurality of packets.

In one exemplary embodiment, the first and the second processor are independently operable processors which are connected via an inter-processor communication (IPC) link. As previously noted, independently operable processors are capable of isolated operation without other processors in the processing system. For example, an independently operable processor can transition into various power-conserving modes independent of the power-conserving modes of other ones of the plurality of sub-systems.

In alternative embodiments, the first and second processor may be dependent on one another for one or more operational modes. For example, some consumer devices use an application processor to execute user space applications and to further control a dependent baseband processor for network connectivity. Such designs may require both processors to be active during high speed bus operation or allow both processors to independently sleep with limitations on the bus connectivity requirements.

In some embodiments, the first or second processor may be in communication with other processors. For example, while the previous discussions were presented within the context of a two processor system, artisans of ordinary skill in the related arts given the contents of the present disclosure, will readily appreciate that the techniques described herein may be applied to e.g., daisy chain, star, ring, multi-drop, or any other multi-processor topology. Moreover, the disclosed functionalities may be applicable to a wide range of multi-processor applications with or without independent operation of the various functionalities. Common examples of such applications include without limitation e.g., high-end consumables, enterprise server infrastructure, communication backhaul networks, and/or any number of other tightly coupled processor topologies which could benefit from non-sequential packet transfer to e.g., improve performance, reduce speed, and/or reduce power consumption.

In one exemplary embodiment, the plurality of applications are executed by an application processor. The plurality of applications may include one or more user space applications and one or more kernel or other operating systems. As a brief aside, the distinction between kernel and user space is based on access privileges to memory and/or other system resources. Generally, the kernel is reserved for running a privileged operating system kernel, kernel extensions, and security sensitive device drivers; the kernel generally does not have access restrictions. In contrast, user space refers to the resources for user application software and some drivers; user space is generally limited by one or more permissions. For example, a user application cannot write to memory outside of its specific memory allocation, whereas the kernel may write to any location of memory.

While the following discussion is described primarily within the context of user space applications, artisans of ordinary skill in the related arts given the present disclosure, will readily appreciate that the various techniques described herein may be readily adapted for kernel space operation given the appropriate changes for the required degree of security and/or privilege. For example, the kernel may use a similar mechanism to support non-sequential delivery of data packets from another appropriately privileged processor or entity, so as to e.g., receive data earlier, reduce power consumption, and/or prioritize certain types of data.

In one exemplary embodiment, the plurality of packets are received at the second processor via a baseband processor. In one variant, the baseband processor includes a wireless network interface. Common examples of wireless interfaces include cellular networks, metropolitan area networks (MAN), wireless local area networks (WLAN), personal area networks (PAN), mesh networks, near-field-communication (NFC), Internet of Things (IoT)/Industrial Internet of Things (IIoT) and/or any number of other wireless communication technologies.

In other variants, the baseband processor includes a wired network interface. Common examples of wired interfaces include local area networks (LAN), communication busses, and/or any number of other optical, acoustic, and/or electrical communication technologies.

Artisans of ordinary skill in the related arts given the present disclosure will readily appreciate that the described functionalities are not limited to wireless or mobile devices. Other "wired" computing technologies that also suffer from communication bottlenecks, and which could benefit from non-sequential packet transfer, include without limitation: multimedia rendering, network serving, data mining, cloud server operation, etc. For example, in some such embodiments, the plurality of packets are generated at a media processor for display on an application processor. In one variant, the media processor may include one or more multimedia sources (e.g., audio, visual, and streaming and/or time sensitive data). In another such example, the plurality of packets may be obtained or generated from one or more servers that are operated in parallel to analyze voluminous data sets (e.g., so-called "big data" processing).

In one embodiment, the plurality of packets include one or more data link layer packets. In one such exemplary embodiment, the one or more data link layer packets are further configured to form one or more network layer packets. In one variant, the one or more network layer packets are further configured to form one or more transport layer packets. As previously noted, data link layer packets are associated with two adjacent nodes on a shared transmission medium. Network layer packets are a container for data with network addresses that can traverse different networks. Transport layer packets are a container for sequentially ordered data that provides a continuous application data stream between endpoints of the communication network. More generally however, the various aspects of the present disclosure are not limited to the aforementioned data link layer, network, or transport layer packets, but may be useful within the transmission of data structures having any particular ordering logic. Common examples of ordered data structures include without limitation: arrays, lists, frames, records, classes, frames, chunks, etc.

In one embodiment, the plurality of packets are associated with an order. Common examples of ordering include without limitation: numerical, alphabetical, enumerated, or other values that are ordered according to ascending, descending, ranking, or other arranging logic. Alternatively, the ordering logic may be arbitrary for a set of the data structures (e.g., applications where the presence of a packet is sufficient without reference to other packets). One such example of an order-less data structure is a fountain code (or rate-less erasure code) that is "rate-less"; i.e., where a number N source symbols can be recovered from any combination of K encoding symbols.

At step 804 of the method 800, the first processor identifies a plurality of data flows corresponding to the plurality of applications.

In one exemplary embodiment, multiple data flows are multiplexed over a common link. As a result, each data flow of the plurality of data flows is a subset of the plurality of packets received by the second processor. More directly, the plurality of packet data is composed of an intermingled set of packets associated with each data flow. Intermingling may be performed according to a variety of different schemes; for example, the packets may be randomly intermixed, evenly intermixed, or other desirable trait (e.g., application priority, ease of routing, and/or other network or device management considerations). As a result of intermingling, each data flow receives only a subset of the plurality of packets.

As previously noted, peer entities for each layer of the communication stack negotiate to manage and control the aforementioned delivery of data flows over the shared medium (see e.g., FIG. 4 and associated discussion regarding Existing Data Link Layer Operation). In one exemplary embodiment, an application byte stream is formatted into transport layer packets for sequentially ordered transfer. The transport layer packets are further formatted into network layer packets to be routed from a source to a destination. Each network layer packet is further formatted into an ordered set of data link layer packets for transmission over a shared transmission medium with a neighbor node of a network. The transport layer, network layer, and data link layer independently intermix their corresponding packets so as to best effectuate their layer-specific considerations e.g., flow control, acknowledgment, error notification, error detection, and/or correction of errors.

As a brief aside, most packets are delivered with no guarantees as to delivery or quality (so-called "best effort"). Best effort delivery is commonly used to maximize overall network bandwidth by minimizing routing complexity. Consequently, each packet may be randomly intermixed with other packets for delivery. Other packet delivery may prioritize or deprioritize various packets relative to one another based on e.g., the underlying importance of the end user space application. For example, human interface applications may be bumped ahead of other applications so as to ensure a smooth human experience (without jerky artifacts). Still other types of packet delivery may guarantee latency and/or throughput or other performance; e.g., a user space application requires receipt of one or more packets according to a minimum time interval and/or at a specified overall data rate.

In one exemplary embodiment, each data flow corresponds to a designated subset of network layer address and sequentially ordered transport layer sequence. A data flow may correspond to a one or more packets associated with a specific user space application. More generally, a data flow may correspond to any packets of the plurality of packets that satisfy one or more conditions. For example, a data flow could correspond to any packets that were originated from, or destined for, a specific port or address, user space application, internal or external network entity, or other networking node.

In some exemplary embodiments, one or more data flows may additionally require the re-transmission of one or more packets that have been corrupted in transit or incorrectly transmitted or received. Some re-transmission technologies wait until acknowledgement for re-transmission; such implementations preserve order because the packet cannot be sent until the current packet is correctly received. Other transmission of packets before an affirmative acknowledgement (order is not preserved because the next packet can be sent before the current packet is correctly received). Common examples of re-transmission technologies include Automatic Repeat Request (ARQ), Stop-And-Wait ARQ, Go-Back-N ARQ, Selective Repeat ARQ, and Hybrid ARQ (HARQ). Moreover, while the foregoing scheme is described within the context of positive acknowledgements (ACKs), the substantially similar corollary of negative non-acknowledgments (NACKs) schemes may be substituted with equivalent success.

Within one exemplary variant, the data link layer can identify one or more data link layer packets within a network packet that have not been correctly received, based on data link layer frame headers and/or cyclic redundancy check (CRC). A subsequent network packet will include the re-transmission of the missing data link layer packets with appropriate header information (and any new data link layer packets).

More generally, the plurality of packets may be intermixed according to any number of layer-specific reasons. The intermixed plurality of packets may be rearranged into the appropriate ordering by the peer layers (transport, network, data link layer, etc.) regardless of data corruptions, missing packets, and/or re-transmissions.

Referring back to step 804, the identification of associations between data flows and applications may be performed according to any number of considerations. For example, in one case, the ordering may be based on a resource allocation. Within the context of a packet based communication, a resource allocation may include a network port, source address, destination address, user space application, and/or memory allocation. More generally, identification corresponds to an association between a data flow and an application. In some cases, a single data flow may be used in a "multicast" or "broadcast" by multiple user space applications. Alternatively, many data flows may terminate within a single user space application. More generally, the identification or mapping of data flows to applications may be one-to-one, one-to-many, many-to-one, or many-to-many.

In some cases, the mapping may be determined ahead of time during an initial instantiation of either the data flow or the application. In some common implementations, an application may create and destroy data flows on an as needed basis. In other implementations, the initial function call which triggers the allocation of memory resources for a user space application may also trigger the creation of a corresponding data flow. Still other user space applications may create data flows that persist and are reused between different subroutines, etc. Regardless of how a data flow or application is created, the association between each data flow and one or more applications may be stored for future reference by the processor networking stack or similar networking stack functionality.

Common examples of data structures that are useful for storing data flow to application mapping include without limitation: logical maps, look up tables, linked lists, arrays, multi-element arrays, enumerated lists, databases, and/or any number of other referential mechanisms. In some cases, the data structure may be located within a host processor. In other variants, the data structure may be located in external memory that is accessible to both a host processor and a peripheral processor. Still other multi-processor embodiments may have multiple data structures that are distributed throughout different ones of the processors. In some cases, where multiple tables are used, the various processors may each have an identical table. Alternatively, each processor may only manage its own adjacent links.

At step 806 of the method 800, a processor of the first or second processor may determine whether non-sequential delivery of packets is supported. In some embodiments, the first and second processor may be pre-configured for only non-sequential delivery (e.g., where the processors' software, firmware, or hardware are "hardened" or otherwise designed only for complementary use). In still other embodiments, the first and or second processor may enable or disable non-sequential processing of packets dynamically based on various application considerations. For example, common considerations may include e.g., support for legacy hardware or software, load balancing between the processors, power management, memory management, processor capability and/or complexity, and/or business considerations.

Common techniques for determining whether a processor supports functionality may be based on e.g., explicit signaling (reading or writing), implicitly inferred from version or other capability information, and/or out-of-band information.

When non-sequential delivery is not supported, the second processor defaults to prior art sequential delivery (e.g., step 808 of the method 800).

For example, a first and a second processor that support legacy operation may transact data packets. In one exemplary embodiment, the second processor receives data packets via a wireless network that are destined for user space applications of a first processor. Any errors in transmission between the second processor and the wireless network are corrected between the second processor and the wireless network. For example, if any data link layer packets were corrupted during reception, then the second processor requests re-transmission or other corrective action.

Thereafter, the second processor forwards the data packets to the first processor by delivering the received data packets to the first processor. Responsively, the first processor determines whether or not the data packets were correctly received (e.g., by verifying the sequential order and CRCs).

Once the first processor's networking stack has successfully received the data packets from the constituent data packets, the networking stack can determine the appropriate user space application to forward the various data packets.

In an alternative implementation, a first and a second processor that support legacy operation may transact data packets via a reduced memory footprint scheme. In one exemplary embodiment, the second processor receives data packets via a wireless network that are destined for user space applications of a first processor and writes the data packets directly to a shared memory.

The second processor indicates to the first processor when all of the required data packets are present (and their corresponding ordering). Responsively, the first processor retrieves the received data packets from the shared memory in order to determine whether or not the data packets were correctly received (e.g., by verifying the sequential order and CRCs).

While the reduced memory footprint scheme saves memory, any errors in transmission between the second processor and the wireless network are still handled by the second processor. For example, if any data link layer packets were corrupted during reception, then the second processor requests re-transmission or other corrective action (the second processor is only notified once all of the data has been correctly received).

Once the second processor's networking stack has successfully received the packets from the wireless network, the first processor can retrieve the data from shared memory to determine the appropriate user space application to forward the various data packets.

Referring now back to step 806 of the method 800, when non-sequential delivery is supported, the second processor transfers the plurality of packets to the first processor apparatus in a non-sequential order (step 810 of the method 800)

In one exemplary embodiment, the packets are forwarded from the second processor to the first processor immediately in the order that they are received. Within this context, the term "immediate" is not used in reference to a specified time, but rather to connote delivery without any intervening manipulations e.g., to correct errors or request re-transmission. In one such variant, the immediate delivery of a data packets obviates the traditional prior art steps of waiting until all data packets in an ordered sequence of data packets has arrived.

Unlike prior art processing configurations which implement network node functionality at the second processor, various embodiments of the present disclosure treat the second processor as a logical pass through network entity. In other words, one or more logical network node functionalities are not present; e.g., logical termination, routing, and/or rerouting point of a communication link. Instead, some (if not all) of the network node functionality is performed at the first processor (see step 812, below).

In some embodiments, immediate delivery enables (but does not require) the delivery of packets earlier than would be possible with existing prior art solutions. Even though the second processor could immediately deliver packets to the first processor, the second processor may wait to deliver packets to optimize for other device considerations. For example, in some cases, an intermittent trickle of packets may result in bus "churn" during low power operation i.e., where the second processor wakes the bus only to send a small amount of data. Under such conditions, the second processor may hold onto the packets until more data has arrived (thereby improving the bus's power efficiency per data transferred). A related problem is high rate burst delivery from low power states that can result in excessive power ramping. Under such conditions, the second processor may hold onto the packets so as to spread the burst data out over a longer interval (allowing for more gradual power ramping). In still other cases, other tasks may have priority over the processing or memory resources of either the first or second processor; for example, a processor may be busy servicing a high priority interrupt. Also, transfer resources may not be available; for example, the aforementioned transfer descriptor ring (TDR) may be in danger of overrun.

In some variants, the second processor may dynamically enable or disable functionality based on whether immediate delivery will reduce packet latency. If the first processor is unable to process packet delivery, then the second processor can use that time to perform intervening manipulations so as to provide improved data to the first processor (when next available.) For example, consider variants that queue data packets to prevent bus churn, under such conditions the second processor may use the wait time to re-order the data packets and/or reconstruct data packets. In other such examples, the second processor can re-order the data packets and/or reconstruct data packets while it is waiting for the first processor to e.g., finish other higher priority tasks or for transfer resources to free up. Still other variations of the foregoing may be readily appreciated by those of ordinary skill in the related arts, given the contents of the present disclosure.

While the foregoing discussion is presented within the context of immediate forwarding to facilitate early delivery of packets, artisans of ordinary skill in the related arts given the contents of the present disclosure, will readily appreciate that the benefits of non-sequential transfer may be further exploited with intervening processing by the peripheral processor to achieve a variety of benefits.

In one exemplary embodiment, rather than immediately transferring packets, the second processor can perform packet processing to prioritize certain types of packets based on e.g., packet headers. For example, the second processor can parse each data packet for the data source and/or destination. Based on the header information, the second processor can rearrange the data transfer to the first processor so as to prioritize certain types of data packets over others. For example, packets with a specific source or destination may be transferred at the first available opportunity, while the other packets are queued for delivery whenever convenient (e.g., best effort).

In some implementations, the second processor is explicitly notified of the first processor's priorities. In such implementations, the first processor may identify certain types of packets or conditions that should be prioritized. For example, the first processor may identify specific address, tags, lengths, payloads of interest. In alternative implementations, the second processor assesses priorities based on inferences regarding the first processor's behavior and/or overall network conditions. For example, the second processor may prioritize packets based on historic traffic and/or historic conditions (e.g., a re-transmitted packet may be prioritized ahead of newly transmitted packets, etc.).

In one exemplary embodiment, rather than immediately transferring packets, the second processor can perform packet processing to forward on only correctly transmitted data packets based on e.g., data link layer level cyclic redundancy checks or start of frame and/or length based information. For example, in contrast to the "immediate transfer" embodiments that implement CRC checking downstream at the first processor, some variants may enable CRC checking at the second processor thereby allowing the second processor to queue re-transmission of data packets earlier.

More generally, artisans of ordinary skill in the related arts given the contents of the present disclosure, will readily appreciate that a variety of operation considerations may be improved by rearranging packet order. Such considerations may include power, processing complexity, memory usage, privilege, user space considerations and/or networking consideration considerations.

In some embodiments, one or more second processor may explicitly notify the first processor of a cross-layer failure. More directly, even though a delivery failure within a first layer may not directly affect another layer due to the independence of the layers, it is possible that a failure may indirectly affect another layer by e.g., delaying corrective actions longer than necessary. In other words, a higher layer process can immediately assume corrective action as soon as its underlying layers have failed. For example, once a data link layer failure requires a transport layer re-transmission, there is no reason to wait for the transport layer timeout; instead the transport layer can immediately send a flush event and initiate re-transmissions.

At step 812 of the method 800, the first processor routes the plurality of packets according to the corresponding data flow of the plurality of applications.

In an exemplary embodiment, the first processor can non-sequentially route data payloads based on correctly received addresses and endpoint-to-endpoint sequencing even though one or more holes prevent sequentially ordered delivery between adjacent nodes of the network. In such embodiments, the host networking stack can still logically terminate the network layer "hop" and transport layer virtual circuit; for example, the networking stack can infer that a network layer packet would have been successfully (or unsuccessfully) delivered based on the ongoing delivery progress of outstanding data link layer packets. Consequently, the host networking stack may provide a proxy network layer communications (e.g., ACK/NACK, timeout) signaling without re-ordering the packets received from its adjacent nodes.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A processor apparatus configured to support non-sequential delivery of data packets, the processor apparatus comprising:
   a first data interface;
   a second data interface configured to interface to another processor apparatus;
   a data processing element; and
   a non-transitory computer-readable medium comprising one or more instructions configured to, when executed by the data processing element, cause the processor apparatus to:
      receive a plurality of transmissions, each transmission containing the data packets for delivery to one of a first application or a second application operable by the another processor apparatus;
      responsive to a determination that the another processor apparatus supports non-sequential delivery of the data packets:
         provide the data packets to the another processor apparatus in a non-sequential order, the data packets comprising information relating to (i) a network port associated with a corresponding one of the first application or the second application, (ii) an endpoint-to-endpoint transport order associated with a subset of the data packets that are designated for a particular one of the first and second applications, and (iii) an over-the-air transport order associated with at least some of the data packets that defines an order in which the data packets are transmitted relative to other data packets of the plurality of transmissions; and
         cause the another processor apparatus to route the subset of the data packets to the particular one of the first and second applications via the network port on a transmission-by-transmission basis provided that the endpoint-to-endpoint transport order indicates that the subset of the data packets are sequentially contiguous with data packets already sent to the particular one of the first and second applications or with data packets stored in a memory of the another processor apparatus,
         store, in the memory of the another processor apparatus, the subset of the data packets provided that the endpoint-to-endpoint transport order indicates that the subset of the data packets are not sequentially contiguous with data packets already sent or with data packets stored in the memory of the another processor apparatus; and
         receive a request to retransmit at least one missing intervening data packet based on a flush event, the missing intervening packet being identified based on the endpoint-to-endpoint transport order.

2. The processor apparatus of claim 1, wherein the one or more instructions, when executed by the data processing element, further cause the processor apparatus to:
   provide a second set of data packets to the another processor apparatus in a second non-sequential order determined based on (i) at least one of a second network address or second network port, and (ii) a second endpoint-to-endpoint transport order associated with the second application.

3. The processor apparatus of claim 1, wherein the second data interface comprises a shared memory interface that is at least partly shared with the another processor apparatus.

4. The processor apparatus of claim 1, wherein the provision in the non-sequential order is further based at least on a power consumption of either the processor apparatus or the another processor apparatus.

5. The processor apparatus of claim 1, wherein the provision in the non-sequential order is further based at least on one or more priorities of an application of the another processor apparatus.

6. A processor apparatus configured to receive non-sequential delivery of data packets, the processor apparatus comprising:
   a first interface configured to receive a plurality of data packets;
   a memory structure;
   a digital processor; and
   a non-transitory computer-readable medium comprising one or more instructions which are configured to, when executed by the digital processor, cause the processor apparatus to:
      execute a plurality of applications;
      identify a plurality of data flows from another processor apparatus, the plurality of data flows corresponding to the plurality of applications, where each data flow of the plurality of data flows comprises a respective subset of the plurality of data packets; and
      for the each data flow of the plurality of data flows:
         responsive to the respective subset being successfully received, determine a first data packet order for the respective subset, and determine a second data packet order for the plurality of data packets, the first data packet order received at a first portion of the memory structure, and the second data packet order received at a second portion of the memory structure; and
         re-order the respective subset according to the first data packet order;
      provide the each data flow to a corresponding one of the plurality of applications in accordance with the re-ordered subset of the plurality of data packets provided that the re-ordered subset of the plurality of data packets are sequentially contiguous with data packets already sent to the corresponding one of the plurality of applications, and provide the plurality of data packets to the plurality of applications in accordance with the second data packet order;

store, in the memory structure, the re-ordered subset of the plurality of data packets provided that the first data packet order indicates that the re-ordered subset of the plurality of data packets is not sequentially contiguous with data packets already sent to the corresponding one of the plurality of applications;

identify at least one missing intervening data packet based on the first data packet order; and request re-transmission of the at least one missing intervening data packets based on a flush event, wherein the first data packet order defines a relationship between packets of the subset of data packets within a corresponding data flow, and wherein the second data packet order defines an order in which the plurality of data packets were transmitted.

7. The processor apparatus of claim 6, wherein the first interface comprises a shared memory interface with another processor apparatus.

8. The processor apparatus of claim 7, wherein the shared memory interface comprises one or more transfer descriptor rings (TDR).

9. The processor apparatus of claim 8, wherein the non-transitory computer-readable medium comprising one or more instructions further comprises instructions that, when executed by the digital processor, cause the processor apparatus to identify one or more missing intervening data packets associated with a data flow; and store the data packets until the identified one or more missing intervening data packets are successfully received.

10. The processor apparatus of claim 7, wherein the shared memory interface comprises a memory configured to store networking metadata.

11. The processor apparatus of claim 6, wherein the non-transitory computer-readable medium comprising one or more instructions further comprises instructions that, when executed by the digital processor, cause the processor apparatus to notify another processor apparatus of one or more prioritized packet types.

12. The processor apparatus of claim 11, wherein the one or more prioritized packet types are based on an application.

13. A method for non-sequential delivery of packets, comprising:

executing a plurality of applications;

identifying a plurality of data flows corresponding to the executed plurality of applications;

receiving sets of data packets corresponding to various ones of the plurality of data flows, each of the sets of data packets comprising:
  (i) first metadata indicative of a corresponding one of the plurality of applications;
  (ii) second metadata indicative of a transport order associated with the set of data packets, the transport order defining an order of the packets within a corresponding set of data packets; and
  (iii) third metadata indicative of another transport order associated with the plurality of data flows, the another transport order defining an order in which the data packets were transmitted;

identifying, based on the second metadata of the data packets being non-sequentially contiguous, that an intervening data packet associated with one data flow of the plurality of data flows is missing;

waiting to retrieve the data packets associated with the one data flow in response to the identifying;

storing in a memory, the data packets whose second metadata is later in sequence from that of the missing intervening data packet;

retrieving and routing the stored data packets associated with the one data flow to the corresponding application based on the first metadata, and based on the missing intervening data packet being successfully received; and requesting re-transmission of the missing intervening data packet based on a flush event, wherein the identifying of the plurality of data flows is based at least on (i) one or more of a network address or network port and (ii) the second metadata associated with an application, and wherein the identifying of the missing intervening data packets is based on the second metadata.

14. The method of claim 13, wherein the flush event is based on a failure in a data link order associated with an adjacent network node.

* * * * *